US012762081B2

(12) United States Patent
Pope et al.

(10) Patent No.: US 12,762,081 B2
(45) **Date of Patent: *Oct. 13, 2026**

(54) NETWORK INTERFACE DEVICE

(71) Applicant: XILINX, INC., San Jose, CA (US)

(72) Inventors: Steven Leslie Pope, Cambridge (GB); Derek Edward Roberts, Cambridge (GB); Dmitri Kitariev, Newport Beach, CA (US); Neil Duncan Turton, Cambridge (GB); David James Riddoch, Cambridgeshire (GB); Ripduman Sohan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,714

(22) Filed: Apr. 22, 2024

(65) Prior Publication Data

US 2024/0345979 A1 Oct. 17, 2024

Related U.S. Application Data

(63) Continuation of application No. 17/199,197, filed on Mar. 11, 2021, now Pat. No. 11,966,351.

(51) Int. Cl.

*G06F 9/48* (2006.01)
*G06F 9/50* (2006.01)
*G06F 13/40* (2006.01)

(52) U.S. Cl.

CPC ........ *G06F 13/4068* (2013.01); *G06F 9/4881* (2013.01)

(58) Field of Classification Search

None

See application file for complete search history.

(56) References Cited

U.S. PATENT DOCUMENTS 7,321,940 B1 1/2008 Smith et al.
10,110,460 B2 * 10/2018 Yalagandula ....... H04L 67/1038
(Continued)

FOREIGN PATENT DOCUMENTS

CN 1628296 A 6/2005
CN 102160341 A 8/2011
CN 110999258 A 4/2020

OTHER PUBLICATIONS

Japanese Office Action for Application No. 2023-554396 dated Dec. 23, 2025.

(Continued)

*Primary Examiner* — Hyun Nam

(74) *Attorney, Agent, or Firm* — Patterson + Sheridan, LLP

(57) ABSTRACT

A network interface device comprises a streaming data processing path comprising a first data processing engine and hubs. A first scheduler associated with a first hub controls an output of data by the first hub to the first data processing engine and a second scheduler associated with a second hub controls an output of data by the second hub. The first hub is arranged upstream of the first data processing engine on the data processing path and is configured to receive data from a first upstream data path entity and from a first data processing entity implemented in programmable circuitry via a data ingress interface of the first hub. The first data processing engine is configured to receive data from the first hub, process the received data and output the processed data to the second hub arranged downstream of first data processing engine.

20 Claims, 22 Drawing Sheets

(56) References Cited

U.S. PATENT DOCUMENTS 10,110,483 B2 * 10/2018 Behringer ............... H04L 45/64
10,445,223 B1 * 10/2019 Tkac ................... G06F 11/3696
10,990,356 B2 * 4/2021 Grant ...................... G06F 7/588
11,317,937 B2 * 5/2022 Nott ..................... A61B 90/361
11,599,486 B2 * 3/2023 Thiruchengode Vajravel ............ G06F 9/4881
2003/0179744 A1 * 9/2003 Grass .................. H04L 12/6418 370/352
2003/0187853 A1 * 10/2003 Hensley ................. G06Q 10/10
2003/0191841 A1 * 10/2003 DeFerranti ............ H04L 45/302 709/226
2004/0190527 A1 * 9/2004 Okura ................... H04L 45/302 370/395.21
2004/0249998 A1 * 12/2004 Rajagopalan ........... H04L 69/10 710/30
2008/0089239 A1 * 4/2008 Todd ................ H04N 21/44227 348/E7.071
2009/0207866 A1 * 8/2009 Cholas ............. H04N 21/23655 370/505
2010/0165832 A1 * 7/2010 Kini .................... H04L 43/0811 370/217
2012/0158395 A1 * 6/2012 Hughes ............... H04L 61/5007 703/21
2012/0233668 A1 * 9/2012 Leafe .................. G06F 9/44526 726/4
2014/0173032 A1 * 6/2014 Kruglick ............... H04L 67/563 709/217
2014/0198799 A1 * 7/2014 Dalal .................... H04L 61/103 370/394
2015/0043335 A1 2/2015 Testicioglu et al.
2015/0149639 A1 * 5/2015 Ismail ..................... H04L 47/72 709/226
2016/0048802 A1 * 2/2016 Luwang ........... G06Q 10/08355 705/338
2016/0246816 A1 * 8/2016 Abiri ..................... G06F 16/148
2016/0344671 A1 * 11/2016 Hussain .................. H04L 67/10
2017/0126790 A1 * 5/2017 Mortsolf ................. H04L 45/38
2018/0024867 A1 * 1/2018 Gilsdorf ................ G06F 3/0665
2019/0207773 A1 * 7/2019 Shelton, IV ........... G16H 10/60
2020/0104269 A1 4/2020 Pope et al.
2021/0141552 A1 * 5/2021 Guim Bernat ........ G06F 9/5038
2021/0192413 A1 * 6/2021 Shirazipour ..... G06Q 10/06311
2021/0192914 A1 * 6/2021 Shelton, IV ........... A61B 18/00
2022/0104821 A1 * 4/2022 Shelton, IV ........... G16H 40/67
2022/0138014 A1 * 5/2022 Maturi ................ G06F 9/44505 709/226
2022/0292042 A1 * 9/2022 Pope ..................... G06F 9/4881
2024/0345979 A1 * 10/2024 Pope ..................... G06F 9/4881
2025/0310259 A1 * 10/2025 Riddoch ................. H04L 47/12

OTHER PUBLICATIONS

Office Action from Chinese Patent Application No. 202280019106.9, dated Jun. 17, 2026.

* cited by examiner

NETWORK INTERFACE DEVICE

CROSS REFERENCE TO RELATED APPLICATION

This Application is a continuation of U.S. Non-Provisional application Ser. No. 17/199,197, filed on Mar. 11, 2021 of which is incorporated herein by reference in its entirety.

TECHNICAL FIELD

This application relates to a network interface device.

BACKGROUND

Network interface devices are known and are typically used to provide an interface between a computing device and a network. Some network interface devices can be configured to process data which is received from the network and/or process data which is to be put on the network.

For some network interface devices, there may be a drive to provide increased specializations of designs towards specific applications and/or the support of increasing data rates.

SUMMARY

A disclosed network interface device comprises: a data processing path comprising a first data processing engine and hubs; a first scheduler associated with a first hub of the hubs to control an output of data by the first hub to the first data processing engine; and a second scheduler associated with a second hub of the hubs to control an output of data by the second hub, wherein the first hub is arranged upstream of the first data processing engine on the data processing path and is configured to receive data from a first upstream data path entity and from a first data processing entity implemented in programmable circuitry via a data ingress interface of the first hub, said first data processing engine configured to receive the output data from the first hub, process the output data and output the processed data to the second hub arranged downstream of the first data processing engine.

A disclosed network interface device comprises: a streaming data processing path comprising one or more data processing engines and data hubs, one or more of the data hubs comprising one or more of a data ingress interface configurable to receive data from a data processing entity provided by programmable circuitry and a data egress interface configurable to provide data to a data processing entity provided by programmable circuitry; and a scheduler associated with a respective hub to control an output of data by the respective data hub to a respective data processing engine, wherein at least one data hub is arranged upstream of a respective data processing engine on the data processing path and is configured to receive data from one or more upstream data processing path entities and from a respective data processing entity, said scheduler being configured to schedule the output of data by the respective hub to the respective data processing engine, said respective data processing engine configured to receive data from the respective upstream data hub, process the received data and output the processed data to a respective hub arranged downstream of the respective data processing engine.

One or more of the data processing engines and/or one or more data hubs may be provided by hardened logic.

The upstream data processing path entity may comprise one or more of an upstream data processing engine; an upstream data hub; an interface configured to receive data from a host computing device; and an interface configured to receive data from a network.

The interface configured to receive data from a host computing device may comprise a direct memory access adapter interface.

One or more data hubs of said one or more data hubs may be configured to be an upstream data hub for one of said data processing engines and a downstream data hub for a different one of the data processing engines.

At least one data hub may be configured to output data to a respective data processing entity via the data egress interface of that hub and to receive data at the data ingress interface of that same hub data from the same data processing entity.

At least one data hub may be configured to output data to a respective data processing entity via the data egress interface of that hub and a different one of the data hubs may be configured to receive at the data ingress interface of that different hub data from the same data processing entity.

One or more of the data processing engines may be configured to be bypassed using a data processing entity.

At least one data hub may be configured to output data to a respective data processing entity via the data egress interface of that hub, said data being terminated by said data processing entity.

At least one data hub may be configured only to receive data via the data ingress interface and not from an upstream data processing path entity.

At least one of said data hubs may be configured to receive data from a first data processing path entity and data from a second data processing path entity and the data processing engine downstream of that data hub may be configured to operate at a higher data rate compared to one or more other data processing engines of the data processing path.

At least one of said data hubs may be configured to output network data via the data egress interface to bypass a remaining part of the data processing path.

At least two of said data hubs may be arranged in parallel with one of said data hubs arranged in parallel configured to receive data from a first data processing path entity and another one of said data hubs arranged in parallel configured to receive data from a second data processing path entity, each of said hubs arranged in parallel being configured to provide an output to respective data processing engines arranged in parallel.

Each of said respective data processing engines arranged in parallel may be configured to provide a respective output to a common downstream data hub.

In use, the network interface device may be provided between a host computing device and a network, said network interface device may comprise an interface configured to receive data from a host computing device and an interface configured to receive data from a network.

The one or more data processing engines may comprise one or more of: a receive streaming engine for processing data received from a network; a transmit processing engine for processing data from a host computing device; a match action engine; a network receive port engine for bus format translation; and a network transmit port engine for bus format translation.

One or more of said data processing engines may be provided by a plurality of data processing engines arranged in series between a respective upstream data hub and a respective downstream data hub.

One or more of said data processing engines may be programmable.

One or more of said data processing entities may comprise a data accelerator.

The data hubs may comprise one or more data storage resources and the respective scheduler associated with a respective hub may be configured to manage said data storage resources.

The data storage resources may comprise one or more buffers.

The data storage resources may be are configured to store data from one or more upstream streaming data processing path entities and when available, data from a respective data processing entity.

The scheduler associated with a respective data hub may be configured to receive first information from the respective data hub indicating an amount of data to be output, said data associated with one or more different data flows and second information from a downstream data hub indicating an amount of available space to receive data, said scheduler being configured to determine based on the first and second information which one or more data flows is to be output by said respective data hub.

The scheduler associated with a respective data hub may be configured to schedule the output of data using quality of service information.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF DRAWINGS

Some embodiments are illustrated by way of example only in the accompanying drawings. The drawings, however, should not be construed to be limiting of the arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

When data is to be transferred between two data processing systems over a data channel, each of the data processing systems has a suitable network interface to allow it to communicate across the channel. The data channel may be provided by a network. For example, the network maybe based on Ethernet technology or any other suitable technology. The data processing systems may be provided with network interfaces that are capable of supporting the physical and logical requirements of the network protocol. The physical hardware component of network interfaces are referred to as network interface devices or network interface cards (NICs). In this document, the network interface device is referred to a NIC. It should be appreciated that the NIC may be provided in any suitable hardware form such as integrated circuit or hardware module. A NIC is not necessarily implemented in card form.

Computer systems may have an operating system (OS) through which user level applications communicate with the network. A portion of the operating system, known as the kernel, includes protocol stacks for translating commands and data between the applications and a device driver specific to the NIC, and the device drivers for directly controlling the NIC. By providing these functions in the operating system kernel, the complexities of and differences among NICs can be hidden from the user level applications. In addition, the network hardware and other system resources (such as memory) can be safely shared by many applications and the system can be secured against faulty or malicious applications.

Figure 1:
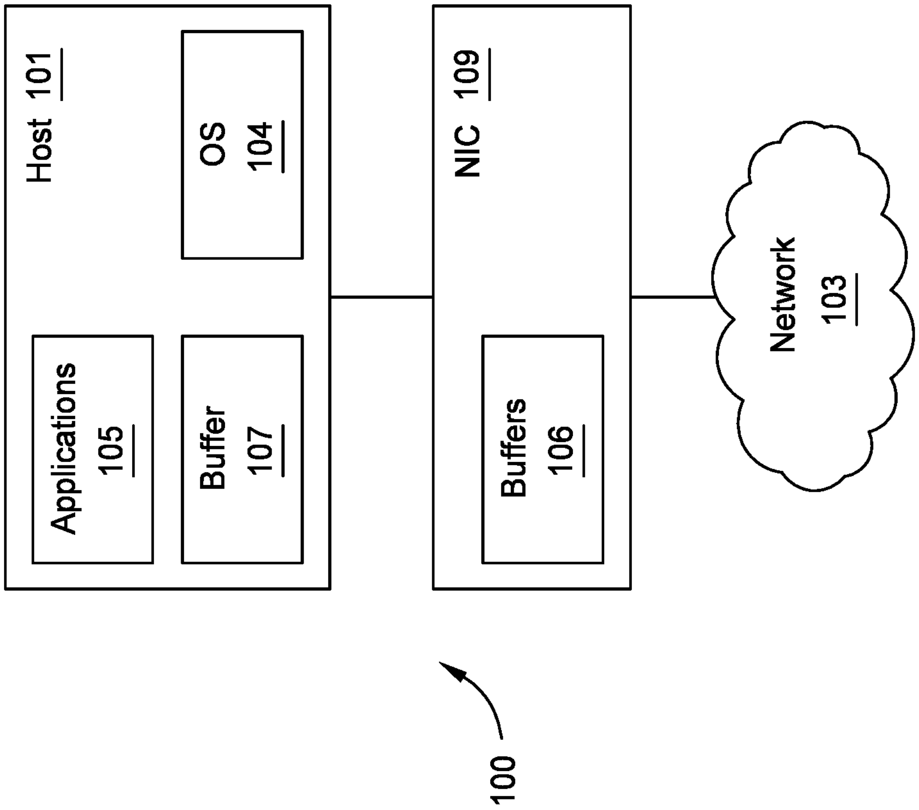
FIG. 1 shows a schematic view of a data processing system coupled to a network via a network interface device.

A typical data processing system 100 for carrying out transmission across a network is shown in FIG. 1. The data processing system 100 comprises a host computing device 101 coupled to a NIC 109 that is arranged to interface the host to network 103. The host computing device 101 includes an operating system 104 supporting one or more user level applications 105. The host computing device 101 may also include a network protocol stack (not shown). The network protocol stack may be a Transmission Control Protocol (TCP) stack or any other suitable protocol stack. The protocol stack may be a transport protocol stack.

The application 105 may send and receive TCP/IP (Internet Protocol) messages by opening a socket and reading and writing data to and from the socket, and the operating system 104 causes the messages to be transported across the network.

Some systems may offload at least partially the protocol stack to the NIC 109. For example, in the case that the stack is a TCP stack, the NIC 109 may comprise a TCP Offload Engine (TOE) for performing the TCP protocol processing. By performing the protocol processing in the NIC 109 instead of in the host computing device 101, the demand on the host system's 101 processor/s may be reduced. Data to be transmitted over the network, may be sent by an application 105 via a TOE-enabled virtual interface driver, by-passing the kernel TCP/IP stack entirely. Data sent along this fast path therefore need only be formatted to meet the requirements of the TOE driver.

The host computing device 101 may comprise one or more processors and one or more memories. In some embodiments, the host computing device 101 and the NIC 109 may communicate via a bus, for example a peripheral component interconnect express (PCIe bus).

During operation of the data processing system, data to be transmitted onto the network may be transferred from the host computing device 101 to the NIC 109 for transmission. In one example, data packets may be transferred from the host to the NIC directly by the host processor. The host may provide data to one or more buffers 106 located on the NIC 109. The NIC 109 may then prepare the data packets and transmit them over the network 103.

Alternatively, the data may be written to a buffer 107 in the host system 101. Some systems may support both of these data transfer mechanisms. The data may then be retrieved from the buffer 107 by the NIC and transmitted over the network 103.

In both of these cases, data may be temporarily stored in one or more buffers prior to transmission over the network.

The data processing system may also receive data from the network via the NIC 109.

A data processing system could be any kind of computing device, such as a server, personal computer, or handheld device. Some embodiments may be suitable for use in networks that operate TCP/IP over Ethernet. In other embodiments one or more different protocols may be used. Embodiments may be used with any suitable networks, wired or wireless.

Figure 2A:
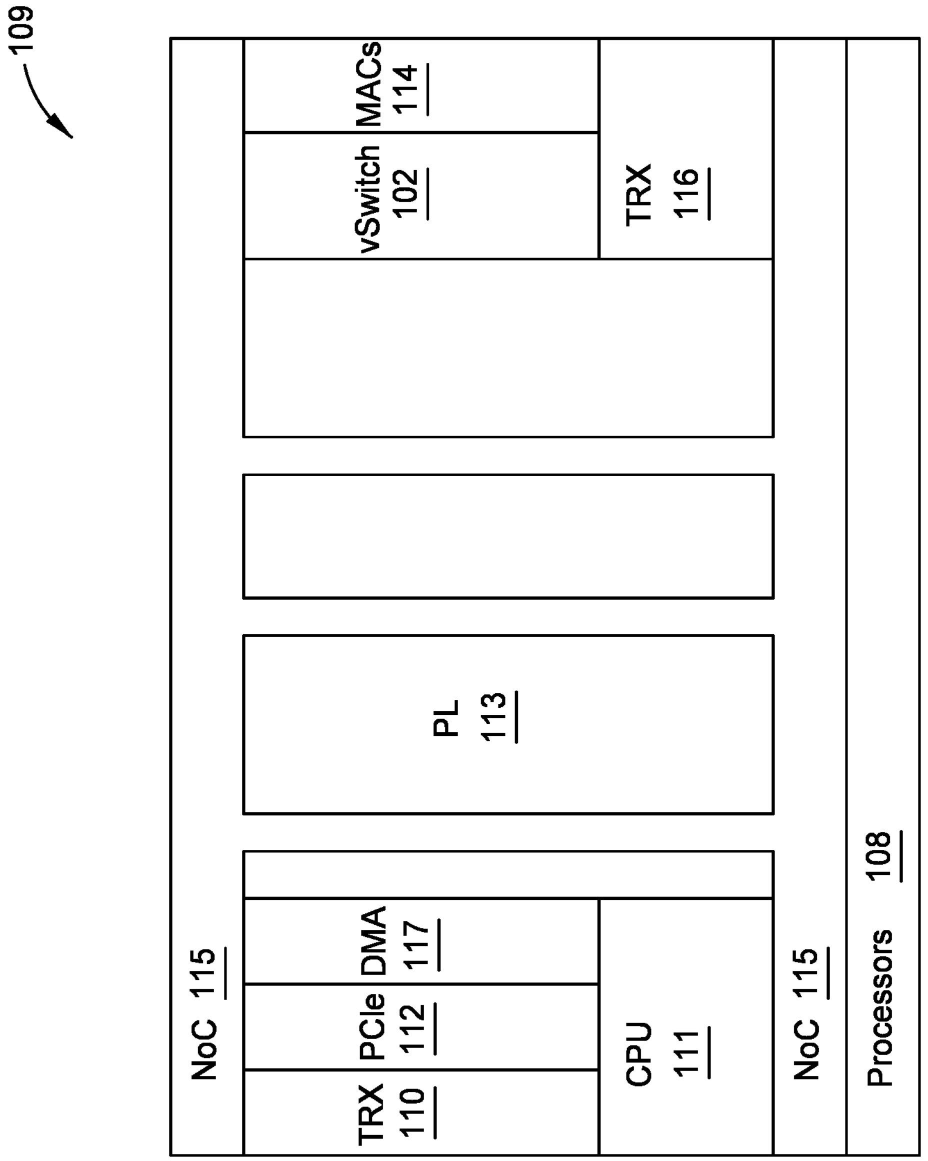
FIG. 2*a* shows a network interface device of some embodiments.

Reference is made to FIG. 2*a* which shows a NIC 109 of some embodiments. The network interface may be at least partially provided by one or more integrated circuits. Alternatively, the NIC may be part of a larger integrated circuit. The NIC 109 may be provided by a single hardware module or by two or more hardware modules. The NIC may provide a network attached CPU in front of the main CPU. The NIC is located on a data path between the host CPU and the network.

The NIC may be configurable to provide application specific pipelines to optimise data movement and processing. The NIC may integrate high-level programming abstractions for network and compute acceleration The NIC of some embodiments may support terabit class endpoint devices. Some embodiments may be able to support terabit data rate processing. For example the NIC may receive data from the network at a terabit data rate and/or put data onto the network at a terabit data rate. However, it should be appreciated that other embodiments, may operate at and/or support lower data rates or even higher data rates.

The arrangement of FIG. 2*a* may be regarded as providing a System-on-Chip (SoC). The SoC shown in FIG. 2 is an example of a programmable integrated circuit IC and an integrated programmable device platform. In the example of FIG. 2, the various different subsystems or regions of the NIC 109 may be implemented on a single die provided within a single integrated package. In other examples, the different subsystems may be implemented on a plurality of interconnected dies provided as a single, integrated package. In some embodiments, the NIC 109 of FIG. 2 may be provided by two or more packages, an integrated circuit or by a chiplet.

In the example, the NIC 109 includes a plurality of regions having circuitry with different functionalities. In the example, the NIC 109 has a processing system provided by one or more CPUs 111. The NIC 109 has one or more first transceivers 116 for receiving data from a network and/or for putting data onto a network. The NIC 109 has one or more virtual switches (vSwitch) or protocol engines 102 which will be described in more detail later. The protocol engine may be a transport protocol engine. This function is referred to a virtual switch function in the following. The NIC 109 has one or more MAC (medium access control) layer functions 114. The NIC 109 has one or more second transceivers 110 for receiving data from a host and/or for providing data to a host. The NIC 109 has one or more PCIe (peripheral component interconnect express) interfaces 112.

The NIC has one or more DMA (direct memory access) adaptors 117. The DMA adaptors provide a bridge between the memory domain and packet streaming domain. This may support memory-to-memory transfers. This will be described in more detail later.

The NIC 109 may comprise or have access to one or more processing cores 108. By way of example only the cores may be ARM processing cores and/or any other suitable processing core.

The NIC 109 has a network on chip (NoC) 115 which is shaded in FIG. 2*a*. This may provide communications paths between different parts of the NIC 109. It should be appreciated that two or more of the components on the NIC 109 may alternatively or additionally communicate via direct connection paths and/or dedicated hardened bus interfaces.

The area between the NoC may include one or more components. For example, the area may accommodate one or more programmable logic (PL) blocks 113 or programmable circuitry. This area is sometimes referred to as the fabric. By way of example only, the programmable logic blocks may at least partially be provided by one or more FPGAs (Field programmable gate array). The area may accommodate one or more look up tables LUTs. One or more functions may be provided by the programmable logic blocks. Some examples of these functions will be described later. The ability to accommodate different functions in this area may allow the same NIC to be used to satisfy a variety of different end user requirements.

It should be appreciated that in other embodiments, any other suitable communication arrangement may be used on the NIC instead of or in addition to the NoC.

The NIC provides an interface between a host device and a network. The NIC allows data to be received from the network. That data may be provided to the host device. In some embodiments, the NIC may process the data before the data is provided to the host device. In some embodiments, the NIC allows data to be transmitted by the network. That data may be provided from the host device and/or from the NIC. In some embodiments, the NIC may process the data before the data is transmitted by the network.

The virtual switch 102 may be an at least partially hardened device or part of the NIC.

There may be a single virtual switch or two or more separate virtual switches.

The virtual switch 102 is able to communicate with other blocks on the chip using the NoC and/or via direct connection paths and/or dedicated hardened bus interfaces. In some embodiments, this may be dependent on the capacity of the NoC versus the quantity of data to be transported. The NoC may for example be used for memory access by the NIC 109. The NoC 115 may be used for delivering data to the CPU 111, the processors 108, the DMA adaptors 117 and/or the PCIe block 112 for example.

In some embodiments, the NoC and/or direct connection paths and/or dedicated hardened bus interfaces may be used to deliver data to one or more accelerator kernels and/or other plugins as will be described in more detail later. In some embodiments, routing may be via the programmable logic. These plugins may in some embodiments be provided by the programmable logic 113.

The virtual switch 102 may be physically located on the edge region of the NIC 109 and communicate with various other components of the NIC 109. In some embodiments, the virtual switch 102 may be arranged in physical proximity to the MAC layer functions 114 and the one or more first transceivers 116. These components may be arranged in physical proximity to the edge region of the NIC 109. The data from the network is received by the one or more first transceivers 116.

In other embodiments, the virtual switch 102, the MAC layer functions 114 and the one or more first transceivers 116 may be physically arranged away from the edge region of the NIC.

Some embodiments may allow a customized NIC function to be provided. This may be useful where a specific NIC function is required. This may be for a particular application or applications or for a particular use of the NIC. This may be useful where there may be a relatively low volume of devices which are required to support that NIC function. Alternatively or additionally this may be useful where customization of a NIC is desired. Some embodiments may provide a flexible NIC.

The customization may be supported by providing one or more functions using the PL 113.

Some embodiments may be used to support a relatively high date rate.

Figure 2B:
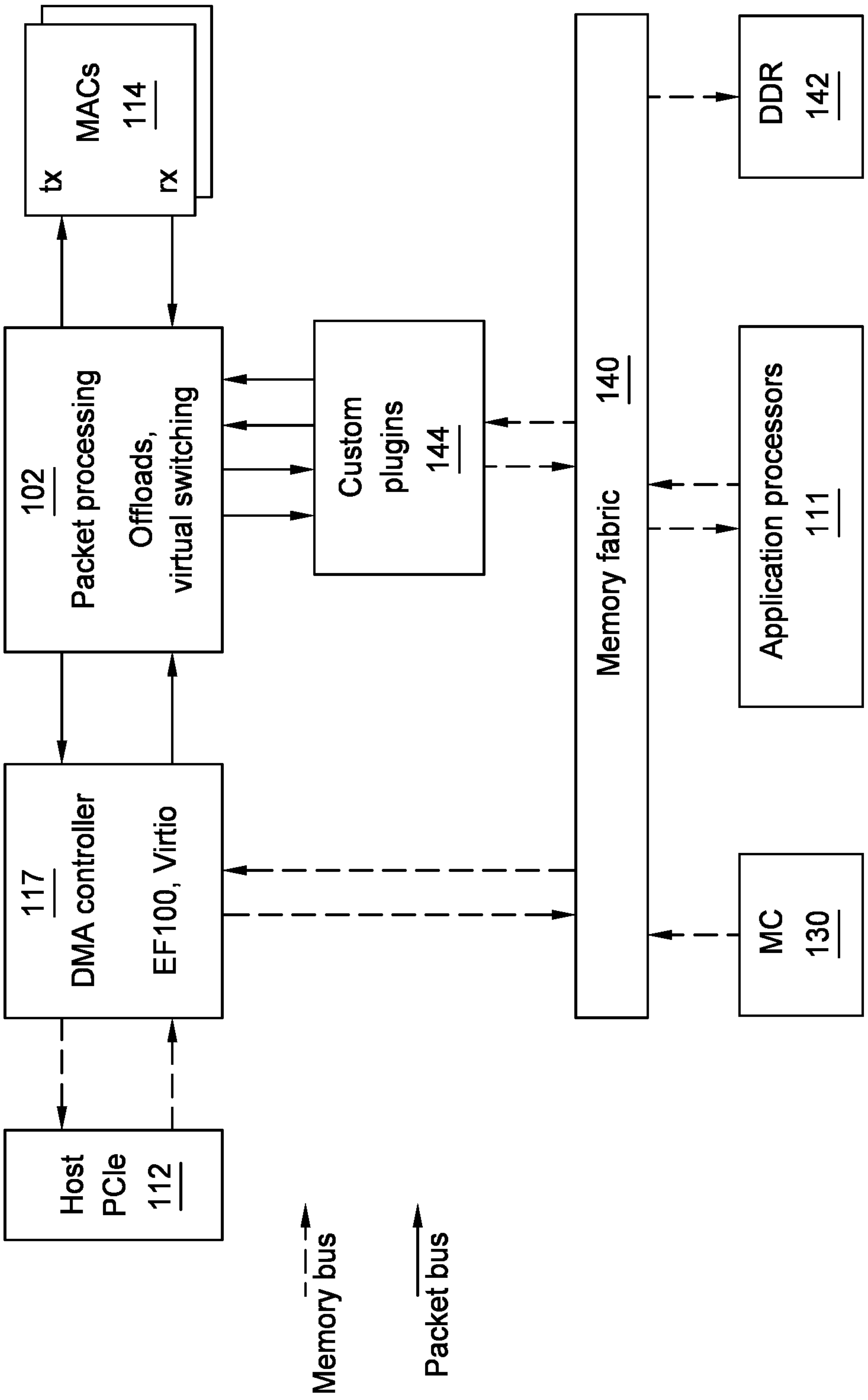
FIG. 2*b* schematically shows subsystems of the network interface device of some embodiments.

Reference is made to FIG. 2*b* which schematically shows the communication paths between the subsystems of the NIC of FIG. 2*a*. The host PCIe interface 112 and the DMA controller 117 communicate via a memory bus. The DMA controller 117 communicates via the memory fabric 140 using a memory bus. A management controller 130 provides control plane messages via the memory fabric 140 using a control bus. Application processors 111 communicate via the memory fabric 140 using a memory bus. Data is received at a DDR memory 142 via the memory fabric using a memory bus.

The DMA controller 117 communicates with the one or more virtual switches 102 via a packet bus. The one or more virtual switches may provide packet processing. The one or more virtual switches may perform offload processing and virtual switching as will be described in more detail later. The processing provided by the one or more virtual switches may be modified using one or more plugins 144, which, in one embodiment, are implemented using the PL blocks 113 in FIG. 2*a*. The plugins may communicate with the memory fabric via a memory bus and with the one or more virtual switches via a packet bus. The one or more virtual switches may communicate with the MACs 114 via a packet bus.

In some embodiments capsules of data may be used to transport data in the NIC. This will be described in more detail later.

Figure 3:
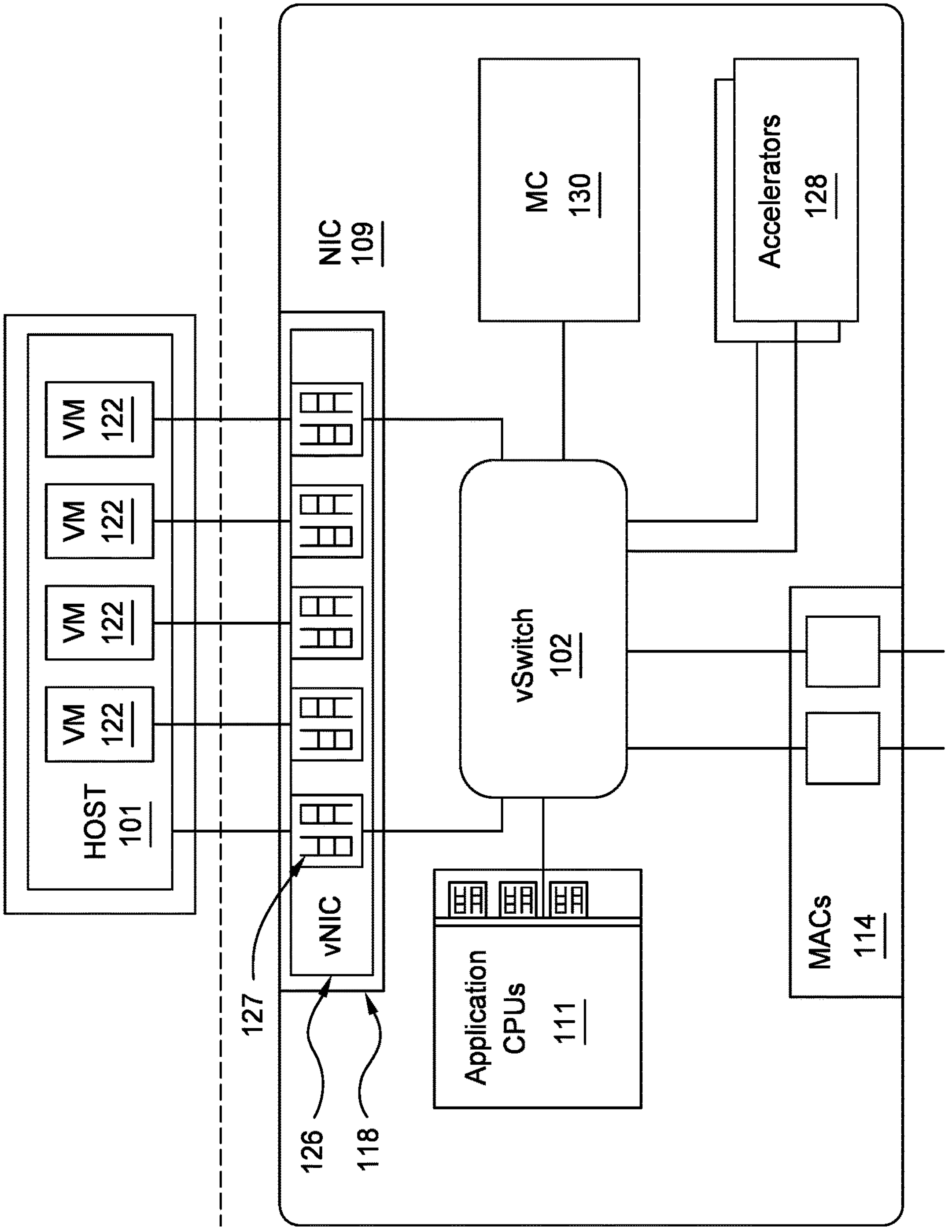
FIG. 3 shows a schematic view of a host and the network interface device of some embodiments.

Reference is made to FIG. 3 which shows a schematic view of the host device 101 and functional blocks supported by the NIC 109. The NIC 109 comprises the virtual switch function 102. This virtual switch function 102 is extendible by one or more plugins as will be described in more detail later.

The virtual switch function 102 with the plugins is able to support custom protocols and switch actions.

The host device 101 comprises a number of virtual machines VM 122.

A number of PCIe PFs (physical function) and/or VFs (virtual function) may be supported. A PCIe function 118 may have multiple virtual NICs (VNICs). Each VNIC 126 may connect to a separate port on the virtual switch. In FIG. 3 one PCIe function and one VNIC of the PCIe function is shown for clarity.

Each vNIC 126 may have one or more VIs (virtual interfaces) 127. Each VI may provide a channel for sending and receiving packets. Each VI may have a transmit queue TxQ, a receive queue RxQ and an event queue EvQ. There may be a one to one relationship between a virtual machine and a virtual function. In some embodiments, there may be a plurality of VIs mapped into a VF (or PF).

In some embodiments, one of the VIs in a given PF or VF may support a function management interface.

The virtual switch 102 comprises a plurality of virtual ports. The ports may be configured to receive data from the TxQ of a VNIC and to transmit data to the RxQ of a VNIC.

The virtual switch 102 is configured to interface with one or more application CPUs provided for example by the CPU 111, the management controller 130 which is configured to control the virtual switch and one or more MAC layer functions 114.

In some embodiments, the virtual switch is extendible by plugins such as previously discussed. One example of a plugin comprises a hardware accelerator 128.

Figure 4A:
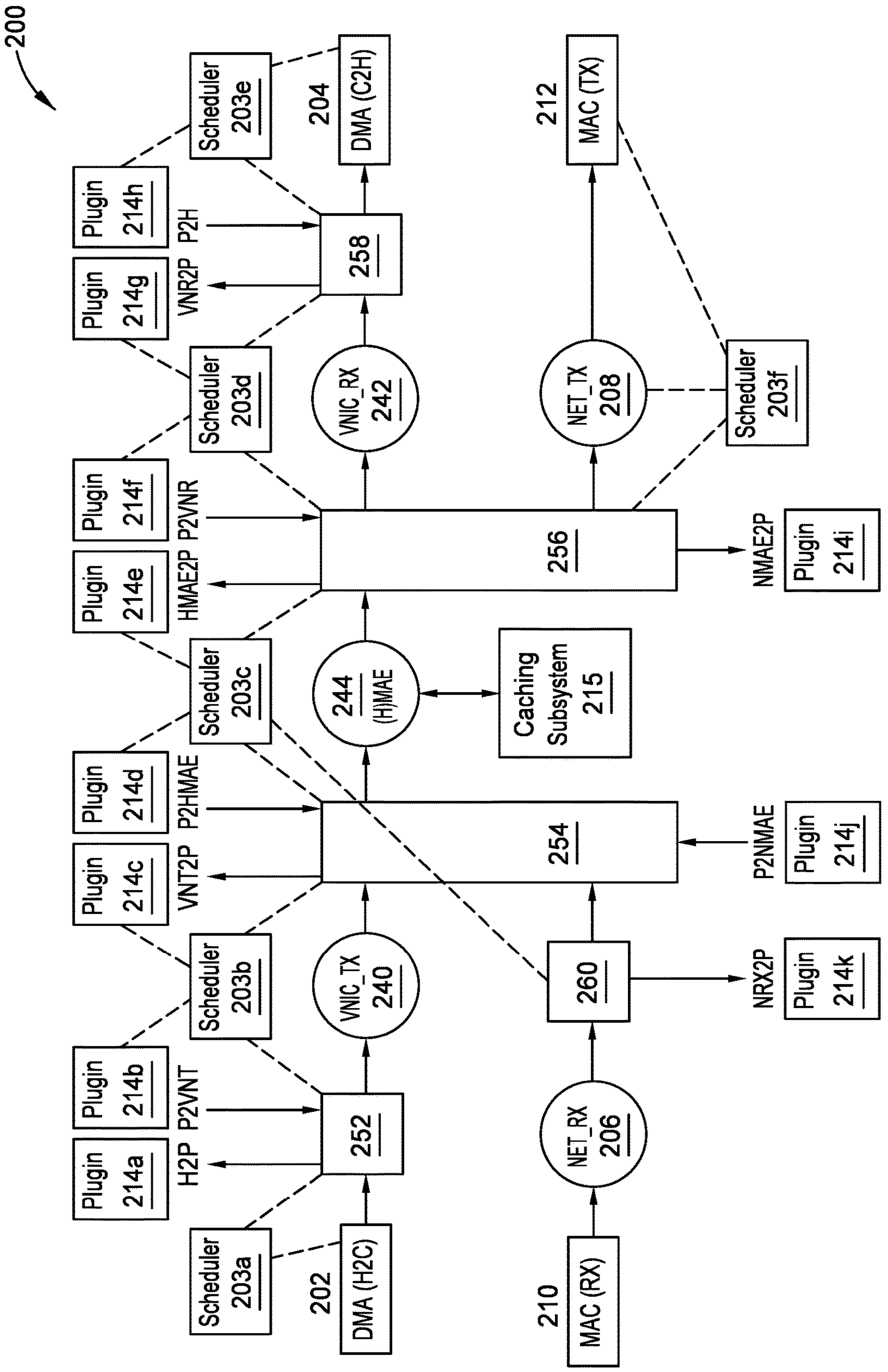
FIG. 4*a* shows one example of a streaming subsystem of the network interface device of some embodiments.

Reference is made to FIG. 4*a* which shows an example of a streaming subsystem 200 of some embodiments provided by the NIC.

There are pipelines on the transmit and receive path of the streaming subsystem. As will be described in more detail, in order to provide some flexibility for the end user applications, the streaming subsystem allows one or more plugins to be added. The plugins may be added into the data path of the pipeline. The one or more plugins may be provided by the programmable logic 113. The other components of the data pipeline may be provided by hardened logic or circuitry.

The components of the data pipeline provided by the hardened logic or circuitry may be provided by the virtual switch function.

The use of the plugins may facilitate the customization of the device. This may allow the same device to be customized for different end users or applications. Alternatively or additionally, the use of plugin allows the same device architecture to be used for a number of different applications.

Data may go out at a point in the data path, go to the plugin and be reinjected back into the data path. This reinjection may be via the same or another plugin. The data may or may not be reinjected back into the data path. This will be described in more detail later.

Schedulers are provided to control the movement of data along the data path. Each stage of the data path is controlled by a scheduler. The plug-ins are also scheduled by the respective scheduler. The schedulers manage resources (such as buffers) which may be contended downstream of a given plugin. This will be described in more detail later. The schedulers may be provided by hardened logic or circuitry.

The streaming subsystem may support a plurality of data interfaces. In some embodiments, one or more data interfaces may be full duplex. This means that the data interface may have ingress and egress halves. In some embodiments, one or more data interfaces may be half duplex. This means that the data interface supports ingress or egress data. Ingress refers to the input of data into the streaming subsystem and egress refers to the output of data from the streaming subsystem.

The data interfaces may use an inter-component streaming bus (ICSB) format or any other suitable bus format.

A DMA (direct memory access) adapter interface 202 is used to pass data between the streaming subsystem and a DMA engine. The DMA adaptor interface provides a data interface. In some embodiments, there may be one DMA adaptor. In other embodiments, there may be more than one DMA adaptor. This is described in more detail later.

In the example shown in FIG. 4*a*, one DMA adaptor interface 202 for the "host-to-card" H2C data flow, that is a data flow from the host computer to the NIC is shown. In some embodiments, more than one H2C DMA adaptors may be provided. This may be dependent on for example the required data speeds and/or available area on the NIC. In some embodiments, two H2C DMA adaptors may be provided. In other embodiments, one H2C DMA adaptor may be provided. In some embodiments, more than two H2C DMA adaptors are provided.

One DMA adaptor interface 204 for the C2H interface may be provided. A C2H is a "card-to-host" data flow, that is from the NIC to the host computer. The DMA adaptor interface may put data onto the NoC (or the fabric).

In some embodiments, the number of C2H adaptors will be the same as the number of H2C DMA adaptors. In some embodiments, the number of C2H adaptor interfaces will be different to the number of H2C DMA adaptor interfaces.

In some embodiments, a single DMA adaptor may support the C2H data flow as well as the H2C data flow. This may be supported by respective DMA adapter interfaces or a shared adapter interface. In other embodiments, the DMA adaptor for the C2H data flow may be different to the DMA adaptor for the H2C data flow. This may be supported by respective DMA adapter interfaces.

DMA provides a bridge between the memory domain and the packet streaming domain as schematically shown in FIG. 2*b*. In some embodiments DMA may support memory-to-memory transfers. Some examples of this will be described in more detail later.

DMA may use descriptor rings for commands from the host to the NIC and completion rings for notifications from the NIC to the host. DMA may support reads of the memory and writes to the memory. The memory may be provided at least partially in the host.

In some embodiments, more than one type of DMA access is supported and may require a specialized capture interface to support that. For example there may be adaptors to support standardised approaches such Virtio (sometimes referred to as VirtIO) and/or vendor specific approaches and/or customized approaches.

The output of the H2C DMA adaptor interface 202 is provided to a first hub 252. The first hub 252 is provided between the H2C DMA adaptor interface 202 and a VNIC-TX (virtual NIC transmit) engine 240. In some embodiments, a hub is able to support at least one streaming inbound plugin and/or at least one streaming outbound plugin. This may allow a user to access the data stream before and/or after each engine. The hub may be provided by hardened logic or circuitry.

It should be appreciated that one hub may be used to support two or more H2C DMA adaptor interfaces 202, when provided.

The H2C DMA is configured to gather one or more packets from memory and stream them to the first hub 252 via the adaptor 202. This will be under the control of a first scheduler 203*a*.

The first scheduler 203*a* is notified by the H2C DMA adaptor of data to be output and may issue job requests to the H2C DMA adaptor.

The first hub 252 has one or more first egress plugins 214*a*. There may be one egress plugin where there is one H2C DMA adaptor. There may be two egress plugins where there are 2 H2C DMA adaptors. This provides connectivity from the host to the plugin (H2P). In other embodiments, there may be a different number of egress plugins as compared to the DMA adaptors.

The first hub 252 has one or more second ingress plugins 214*b*. This provides connectivity from the plugin to the virtual NIC (TX) engine (P2VNT). There may be one ingress plugin where there is one H2C DMA adaptor. There may be two ingress plugins where there are 2 H2C DMA adaptors. In other embodiments, there may be a different number of ingress plugins as compared to the DMA adaptors.

Where there are two half bus width data interfaces, the first hub may be configured to process the received data to provide a full bus width data output. The plugin interface may support the total bandwidth of the pipeline at the point where the plugin is made. Depending on the implementation this may be a single bus interface or an aggregation of narrower buses. The DMA adaptors may be accessed by the NoC or via the fabric.

A second scheduler 203*b* is configured to control the output of data by the first hub 252.

The first hub 252 provides an output to the VNIC-TX (virtual NIC transmit) engine 240. The VNIC-TX engine 240 may process packets sent by drivers through the host interface, via the DMA adaptor, and/or received via the ingress interface and perform one or more of the following functions on behalf of the driver:

Checksum offloads

VLAN (virtual local area network) insert offload

Packet validation (e.g. enforce source addresses, firewalling and/or the like)

In other embodiments, one or more alternative or additional functions may be performed.

The VNIC-TX engine is configured to output data to a second hub 254.

The second hub 254 has one or two egress plugins 214*c*. This provides connectivity from the virtual NIC (TX) engine to the plugin VNT2P. There may be one egress plugin where there is one H2C DMA adaptor 204. There may be two egress plugins where there are 2 H2C DMA adaptors. In other embodiments, there may be a different number of egress plugins as compared to the DMA adaptors.

The second hub 254 has one or two ingress plugins 214*d*. This provides connectivity from the plugin to a MAE (match action engine) 244 (P2HMAE) from the host side.

There may be one ingress plugin where there is one H2C DMA adaptor 204. There may be two ingress plugins where there are 2 H2C DMA adaptors. In other embodiments, there may be a different number of ingress plugins as compared to the DMA adaptors.

A third scheduler 203*c* is configured to control the output of the data by the second hub 254.

The second hub provides an output to the MAE 244. The MAE 244, in some embodiments makes use of a caching subsystem 215 provided for the streaming subsystem. The MAE may perform any suitable functions such as a parse-match-action function, an encapsulation function, and/or a decapsulation function.

The MAE engine may implement the virtual switching functions with a rule-driven parse-match-action engine. For example, rules are provided by drivers. Each rule may provide a set of match criteria, and a set of actions to apply to packets that meet those criteria.

The MAE engine may perform virtual switching functions and other offloads. This may comprise one or more of:

mapping packets from ingress virtual port to egress virtual port(s);

replicating packets to two or more egress ports;

encapsulation and decapsulation;

connection tracking and NAT (network address translation);

packet filtering;

packet labelling; ECN (explicit congestion notification marking); and packet and byte counting.

The MAE may comprise:

a match engine (ME), a streaming processor, which parses packets and performs lookups in rule tables in the cache subsystem;

a replay hub, which performs packet replication when needed, and packet drop; and an action engine (AE), a streaming process, which invokes actions indicated by matched rules.

The match engine first parses incoming packets. This may be a three step process:

1. Parse outer headers, which may be part of an encapsulation. Headers parsed include Ethernet, VLANs (virtual local area network), IP (internet protocol) and UDP (user datagram protocol) headers.
2. Lookup header fields and source port in an outer rule table, which is in an STCAM (smart ternary content addressable memory) or BCAM (binary content addressable memory) or any other suitable memory of the cache subsystem. A key is formed from a subset of the header fields plus some metadata, and rules match an arbitrary subset of the key bits. The lookup result may identify one or more of the encapsulation present (if any), fields relating to connection-tracking (used later) and an outer rule ID.
3. Parse remaining encapsulation headers (if present) and parse the inner (or only) headers. Parsing starts again at the beginning of the frame. If an encapsulation is present, headers already parsed in step (1) and identified as part of the encapsulation are skipped. Typically, a further encapsulation header is then parsed, followed by inner headers. If no encapsulation is present, then the inner frame parsing starts again at the start of the frame.

The MAE 244 provides an output to a third hub 256. The third hub 256 is provided between the MAE 244 and a VNIC-RX engine 242.

The third hub 256 has one or two ingress plugins 214*f*. This provides connectivity from the MAE engine to the plugin (HMAE2P). There may be one ingress plugin where there is one H2C DMA adaptor 204. There may be two ingress plugins where there are 2 H2C DMA adaptors. In other embodiments, there may be a different number of ingress plugins as compared to the DMA adaptors.

The third hub 256 has one or two egress plugins 214*e*. This provides connectivity from the plugin to the virtual NIC (RX) engine (P2VNR). There may be one egress plugin where there is one H2C DMA adaptor 204. There may be two egress plugins where there are 2 H2C DMA adaptors. In other embodiments, there may be a different number of egress plugins as compared to the DMA adaptors.

The third hub may optionally have one or more further egress plugins 214*i*. This provides connectivity to the plugin from the MAE (match action engine) 244 (NMAE2P) from the network side destinations. There may be no ingress plugin to the networking half of the third hub 256 because injecting the data at this location is the same as sending it directly to TX MAC(s) which is supported in some embodiments. It should be appreciated that in other embodiments, one or more ingress plugins may be supported by the networking half of the third hub 256.

There may be one further egress plugin where there is one H2C DMA adaptor 204. There may be two further egress plugins where there are 2 H2C DMA adaptors. In other embodiments, there may be a different number of further egress plugins as compared to the DMA adaptors.

Alternatively or additionally, there may be an interconnect which routes traffic between a respective hub plugin interface and the streaming subsystem and a number of DMA adapters. The interconnect may be regard as an ingress plugin and/or an egress plugin. For example, this may be the NoC or a bus structure created in programmable logic The VNIC-RX engine or processor may handle packets bound for the host or embedded processors. It may perform one or more of the following functions on behalf of the driver that will receive the packet:

Packet classification

Checksum functions, for example calculation and validation

Flow steering and/or RSS (receive side scaling)

Packet filtering

A fourth scheduler 203*d* is configured to control the output of the data by the third hub 256.

The VNIC-RX engine 242 is configured to output data to a fourth hub 258.

The fourth hub 258 is provided between the VNIC-RX engine 242 and the C2H DMA adaptor 204.

The fourth hub 258 has one or two egress plugins 214*g*. This provides connectivity from the virtual NIC (RX) engine to the plugin (VNR2P). There may be one egress plugin where there is one H2C DMA adaptor 204. There may be two egress plugins where there are 2 H2C DMA adaptors. In other embodiments, there may be a different number of egress plugins as compared to the DMA adaptors.

The fourth hub 258 has one or two ingress plugins 214*h*. This provides connectivity from the plugin to the C2H DMA adapter (P2H). There may be one ingress plugin where there is one H2C DMA adaptor 204. There may be two ingress plugins where there are 2 H2C DMA adaptors. In other embodiments, there may be a different number of ingress plugins as compared to the DMA adaptors.

A fifth scheduler 203*e* is configured to control the output of the data by the fourth hub 258.

One or more network port receive streaming engines NET_RX 206 is provided to pass data to the streaming subsystem from one or more MACs (medium access controller) 210. The NET_RX engine may translate the MAC bus interface to the bus format used the streaming subsystem. By way of example only, this may be an ICSB bus. In some embodiments there may be one NET_RX engine instance configured to receive data from the RX MACs. In some embodiments there may be two NET_RX engine instances with each NET_RX engine configured to receive data from n RX MACs. n may be any suitable number and in some embodiments is 8. The NET_RX is used to allow data to pass to the streaming subsystem from the receive MACs.

The NET_RX 206 is configured to provide an output to a fifth hub 260. This allows network RX data to be sent to user logic whilst making use of the data buffers provided by the fifth hub. The fifth hub may be optional in some embodiments. The fifth hub may optionally have one or more egress plugins 214*k*. There may be one egress plugin where there is one H2C DMA adaptor 204. There may be two egress plugins where there are 2 H2C DMA adaptors. In other embodiments, there may be a different number of egress plugins as compared to the DMA adaptors.

The fifth hub 260 may provide an output to the second hub 254.

The fifth hub 260 may be used in conjunction with an egress plugin for data. This for example can allow the rest of the pipeline to be bypassed. This allows for example received data to be directed to the fabric of the NIC via the egress buffer. Scheduling is managed by a scheduler for this hub (not shown).

The third hub 256 can be used in conjunction with a plugin to handle an ingress of data. This for example can allow the rest of the pipeline to be bypassed. This allows for example data from the fabric to be directed to the TX part via an ingress buffer. Scheduling is managed by one of the schedulers.

It should be noted that the second hub 254 may optionally have one or more further ingress plugins 214*j*. This provides connectivity from the plugin to a MAE (match action engine) 244 (P2NMAE) from the network side. There may be one further ingress plugin where there is one H2C DMA adaptor 204. There may be two further ingress plugins where there are 2 H2C DMA adaptors. In other embodiments, there may be a different number of egress plugins as compared to the DMA adaptors.

One or more network port transmit streaming engines NET_TX 208 is provided to pass data from the streaming subsystem to one or more transmit MACs (medium access controller) 212. (These MACs may the MACs 114 shown in FIGS. 2*a*, 2*b* and 3) In some embodiments there may be one NET_TX engine instance configured to transmit data to the TX MACs. In some embodiments there may be two NET_TX engine instances with each NET_TX engine configured to transmit data to n TX MACs. n may be any suitable number and in some embodiments is 8. The NET_TX engine may be configured to cover the bus format of the streaming subsystem to that of the MACs.

The NET_TX 208 is configured to receive an output from the third hub 256. A sixth scheduler 203*f* is configured to control the output of data by the third hub to the NET_TX 208.

Alternatively or additionally, there may be an interconnect which routes traffic between a respective hub plugin interface and the streaming subsystem and a number of DMA adapters. The interconnect may be regarded as an ingress plugin and/or an egress plugin. For example, this may be the NoC or a bus structure created in programmable logic.

As discussed, one or more plugin interfaces are provided by one or more hubs. In some embodiments a plugin interface may be an ingress plugin interface which injects data into the streaming subsystem data path. In some embodiments a plugin interface may be an egress plugin interface which is used to extract data from the streaming subsystem data path. The data may be provided by and/or to user kernels and/or other functions. The user kernels and/or other functions may be provided by other parts of the NIC. In some embodiments, the user kernels or other functions may be provided by programmable logic. In some embodiments, the user kernels and/or other functions may be provided by hardware. In some embodiments, the user kernels and/or other functions can be used to allow the NIC to be customised to the end use requirements of the NIC.

In some embodiments, the number of ingress and egress plugin interfaces may be the same. For example there may be 10 ingress plugins and 10 egress plugins. In other embodiments there may be more or less than 10 ingress/egress plugins. In some embodiments, the number of ingress and egress plugins may be different.

In some embodiments, a plugin interface may be bidirectional supporting the ingress and egress of data.

In some embodiments, there may be fewer plugin interfaces than plugins. In these embodiments, the plugin interface may multiplex traffic to/from a number of plugin points. The number may be two or more.

A plugin may have a full width bus interface or a half bus width interface. Where a plugin has a half width bus interface, the plugins may be provided in pairs. This may be to allow the plugins to match the full speed of the streaming subsystem data path at each point. The streaming subsystem data path may operate with a full width bus.

Where a plugin interfaces has a full width interface, there may be only one plugin interface associated with a given injection or extraction point.

The VNIC TX engine 240, MAE 244, VNIC RX engine 242, NET_RX engine 206, and NET TX engine 208 are non-limiting examples of data processing engines.

Figure 4B:
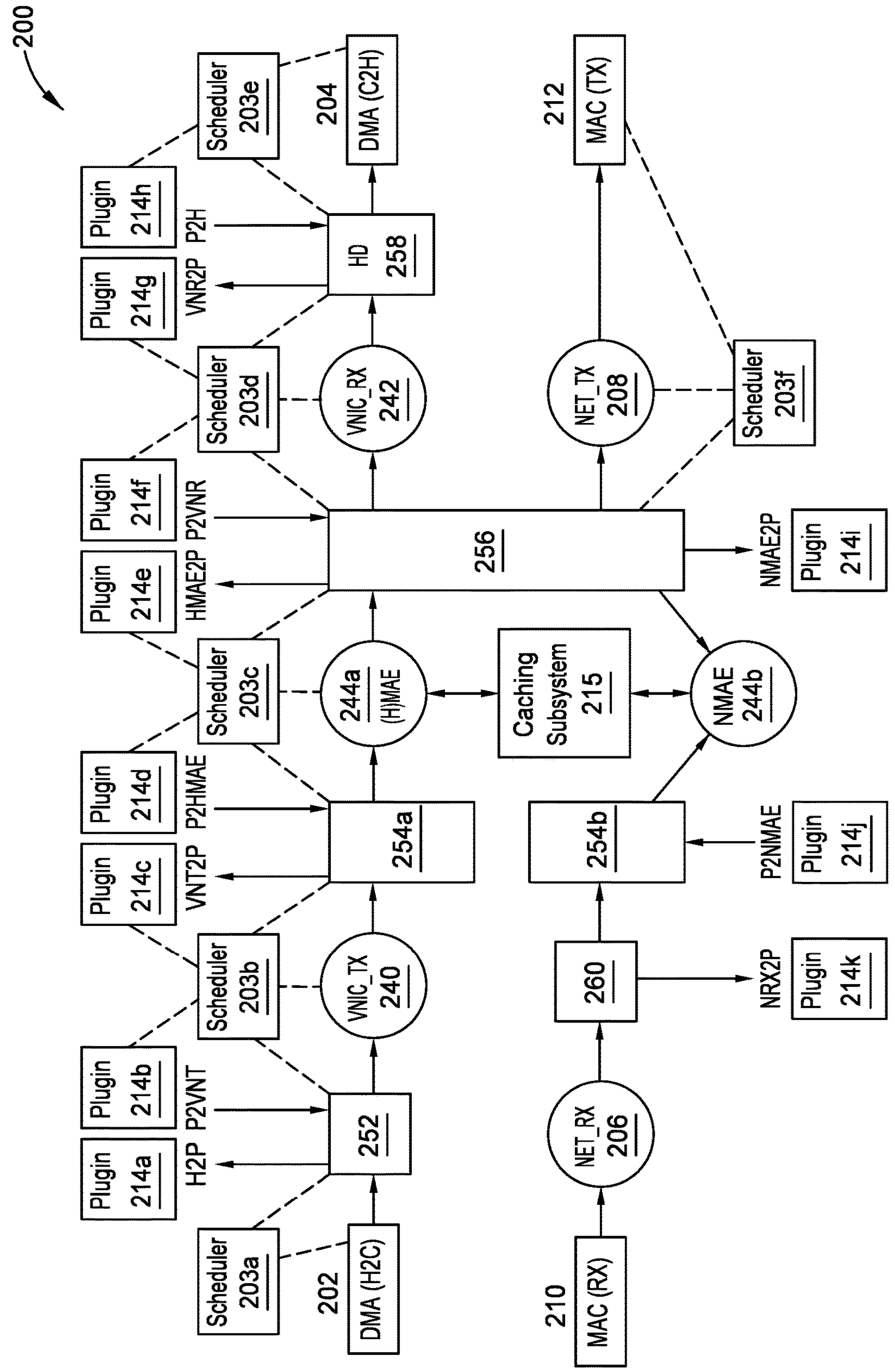
FIG. 4*b* shows another example of a streaming subsystem of the network interface device of some embodiments.
Figure 4C:
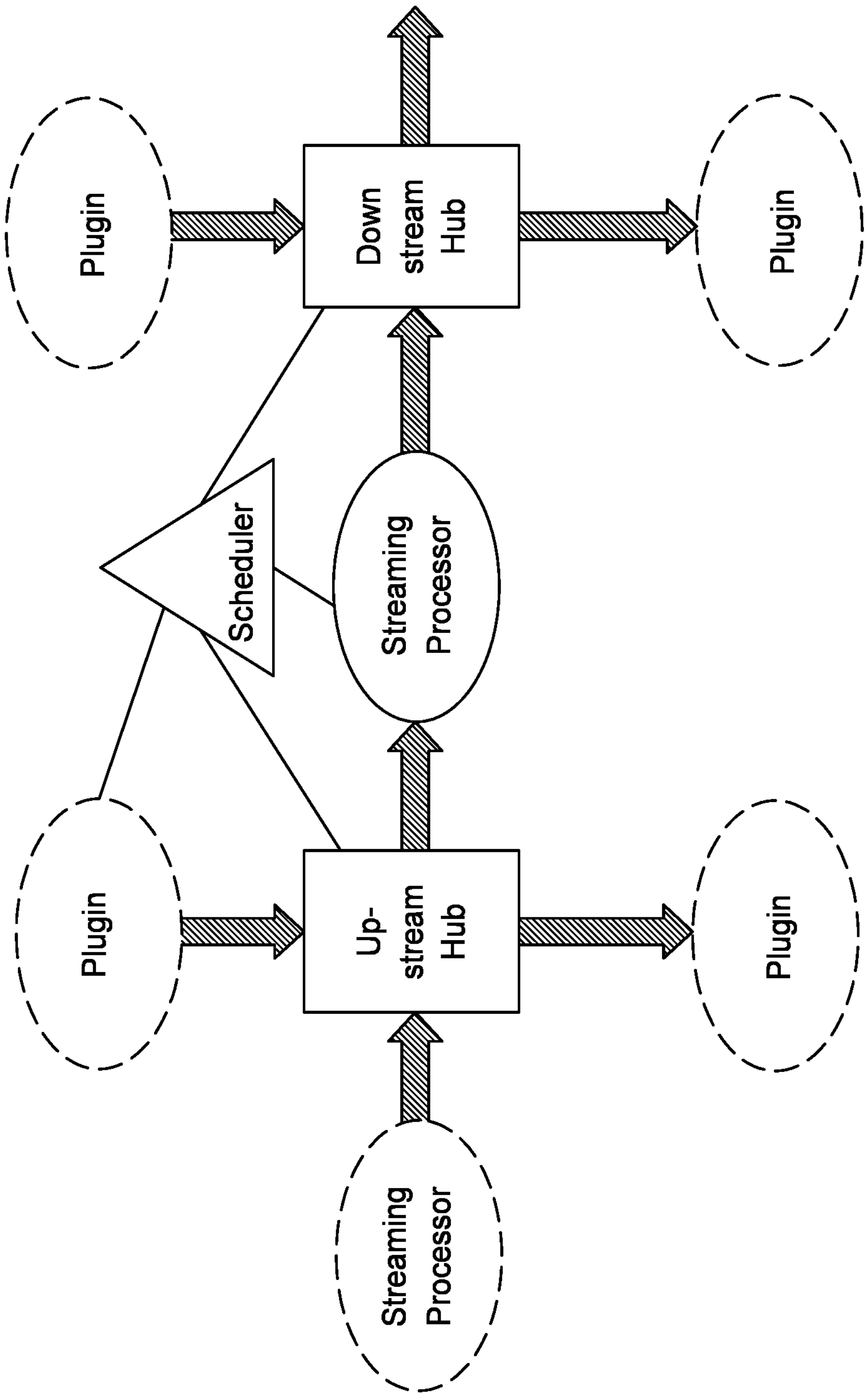
FIG. 4*c* schematically shows a streaming processor with upstream and downstream hubs of some embodiments.

Reference is made to FIG. 4*c*, which schematically shows a streaming processor or engine. The streaming processor has an upstream hub and a downstream hub. This may allow a user to access the data stream before and after each engine. The arrangement shown in FIG. 4*c* is used in the arrangements of FIGS. 4*a* and *b*.

The hubs are common to the receive and transmit flows in some embodiments. This may allow for flexible flow of data between the receive and transmit paths.

A hub may have one or more ingress plugins and one or more egress plugins.

The streaming processors generally do not block. The streaming processors aim to in general to avoid the occurrence of back pressure except transiently. The system may support a number of virtual channels which enable flows to be prioritised and accommodate blocking behaviour. For example a look up of a flow is made in a local cache and the flow entry is not resident in the local cache. A fetch from remote memory (e.g. DDR) would need to be performed which may take some number of clock cycles. The cache subsystem may support pipelining of lookups and a large number of outstanding remote memory read requests, but for a traffic pattern which has poor cache locality, the processing of some flows may cause head of line blocking. The virtual channels may prevent this blocking from affecting other flows from other virtual channels.

The streaming processors may support a particular bandwidth.

Hubs may provide downstream buffering for the upstream processors and plugins that may wish to inject data into the streaming subsystem. Each hub contains or is controlled by a scheduler so that data can be extracted/injected from all plugins at the same time if required. The hubs may be used to create customizations (including loops) to the pipeline. The scheduler shown in FIG. 4*c* is for scheduling the upstream hub. Destination credits for the downstream hub are used by the scheduler.

Going back to the arrangement of FIG. 4*a*, the transmit path may be as follows. The transmission of data may be initiated by the host or application CPU which provides one or more entries in one or more DMA transmission queues. The H2C DMA adapter interface 202 will provide an output to the VNIC TX engine 240 via the first hub 252. The VNIC TX engine 240 will provide an output to the MAE 244 via the second hub 254. The MAE 244 may provide a virtual switch function between the transmit and receive paths. The MAE 240 provides an output to the NET_TX engine 208 via the third hub 256. The NET_TX engine 208 provides an output to the transmit MAC 212.

The receive path may be as follows. Data from the network may be received by the receive MAC 210 which provides an output to the NET_RX engine 206. The NET_RX engine provides an output to the MAE 244 via the fifth hub 260 and the second hub 254. The MAE 244 provides an output to the VNIC_RX engine 242 via the third hub 256. The VNIC_RX engine 242 provides an output via the fourth hub 258 to the C2H DMA adapter interface.

A host loop path may be as follows. The transmission of data may be initiated by the host or application CPU which provides one or more entries in one or more DMA transmission queues. The H2C DMA adapter interface 202 will provide an output to the VNIC_TX engine 240 via the first hub 252. The VNIC_TX engine 240 will provide an output to the MAE 244 via the second hub 254. The MAE 244 provides an output to the VNIC_RX engine 242 via the third hub 256. The VNIC_RX engine provides an output via the fourth hub 258 to the C2H DMA adaptor interface.

A network to network flow path may be as follows. Data from the network may be received by the receive MAC 210 which provides an output to the NET_RX engine 206. The NET_RX engine 206 provides an output to the MAE 244 via the fifth hub 260 and the second hub 254. The MAE 240 provides an output to the NET_TX engine 208 via the third hub 256. The NET_TX engine 208 provides an output to the transmit MAC 212.

In some embodiments, a bus connection is provided between each of the entities in FIG. 4*a*. In some embodiments, the bus connection provided between each of the entities may be the same width. In some embodiments, the data is injected into the streaming subsystem using the full bus width. In other embodiments, data may be injected into the streaming subsystem using a half the bus width. In this latter case, there may be a pair of data injecting entities.

The data injecting entities may comprise one or more plugins, the DMA adaptor(s) and/or the receive MACs 210.

In some embodiments, the data is removed from the streaming subsystem using the full bus width. In other embodiments, data may be removed from the streaming subsystem using a half the bus width. In this latter case, there may be a pair of data removing entities.

The data removing entities may comprise one or more plugins, the DMA adaptor(s) and/or the transmit MACs 212.

In some embodiments, the MAE is required to process traffic from the VNIC TX engine 240 and from the network port receive streaming engines NET_RX 206. Each of the VNIC TX engine and the network port receive streaming engines NET_RX 206 may support a data rate of up to X. Potentially the MAE may then need to support a data rate of up to 2×.

In some embodiments, depending on the use scenario, in practice the average data rate needed to be supported by the MAE is only X. In that case the MAE can function at the same rates as the VNIC TX engine and the network port receive streaming engines NET_RX 206. The buses between the MAE and its hubs may thus be of the same width as the other buses of the streaming subsystem.

In other embodiments, the data rate needed to be supported by the MAE may be greater than X. In some embodiments, the MAE may need to support a data rate of up to 2×. This may be supported by modifying the bus to and from the MAE. The bus width may be increased (for example doubled) and/or the clock rate of the bus may be increased.

Some embodiments may use a segmented bus. A segmented bus is a streaming bus where the overall data path width is split into physically distinct pieces. Each segment has its own principal control signals (for example SOP (start of packet) and EOP (end of packet)). A segmented bus may be used to overcome potential inefficiency of any bus of fixed width carrying capsules of arbitrary size. Without segmentation, if a capsule is (say) one byte longer than the bus width, 2 bus beats (clock cycles) will be required to carry the capsule; the entire bus save for one byte carries nothing on the second beat. A segmented bus allows the next capsule to begin transmission in the second bus beat in the example above, recovering much of the wasted bandwidth. As the number of segments increases, the bus bandwidth for an arbitrary capsule size trends towards 100% of its theoretical maximum. However this needs to be balanced against the complexity and resources of the multiplex and demultiplex operations required with increased segmentation. The advantages of a segmented bus may be balanced against options such as increasing the width or clock speed of a non-segmented bus. This may be dependent on the required implementation. The number of segments and segment widths can vary with the constraints.

Often the bus may be divided into 4 segments, but this can vary depending on how strong the constraints are.

The frame size may be modified and/or the number of segments which are supported by the bus width.

The MAE may operate at a higher data rate than the other engines.

One modification is shown in FIG. 4*b*. In this modification, two MAE engines 244*a* and 244*b* are provided. The first MAE 224*a* may be regarded as a host MAE for processing data from the host. The second MAE 244*b* may be regarded as a network MAE for processing data from the network. Each of the MAEs provides an output to the third hub 256. It should be appreciated that in other embodiments there may be more than two MAE engines arranged in parallel.

The second hub function of FIG. 4*a* is provided by two hubs 254*a* and 254*b*. The hub 254*a* is arranged to receive an output from the VNIC TX engine along with any plugins associated with that hub. The hub 254*a* is configured to provide an output to the first MAE 244*a*. The hub 254*b* is arranged to receive an output from the NET_RX engine 206 along with any plugins associated with that hub. The hub 254*b* is configured to provide an output to the second MAE 244*b*.

The scheduler 203*c* may receive inputs from both the MAE engines and both the hubs 254*a* and *b*.

In this embodiment, the buses between each of the MAEs and their respective hubs may thus be of the same width as the other buses of the streaming subsystem and allow each MAE to support the data rate X, It should be appreciated that X may be any suitable value. For example, X may be 200 or 400 Gb/s. It should be appreciated that these values are purely by way of example and may be different in different embodiments.

In some embodiments, there may be twice the number of egress plugin supported by hub 256 as compared to other of the hubs. In both of the embodiments discussed in relation to FIGS. 4*a* and 4*b*, the aggregate bandwidth of the third hub may be twice the bandwidth at either of the first hub 252 and the fifth hub 260.

In some embodiments, the data path effectively includes the plugin. This may in some cases avoid the need for issues of timing to be considered. The schedulers will take care of the timing when a plugin is provided. The schedulers will be described in more detail later. As mentioned, the hubs may provide downstream buffering for the upstream processors and plugins that may wish to inject data into the streaming. This may be controlled by the schedulers Alternatively or additionally one or more components of the data path can be bypassed or replaced by a plugin.

The plugins may be dynamically loaded. That is, a plugin may be installed after the NIC has been installed.

A plugin may be any suitable component. By way of example, the plugin may be a hardware component. The plugin may be a hardware component of an accelerated application. Plugins may allow for custom protocol and/or acceleration support.

Figure 5:
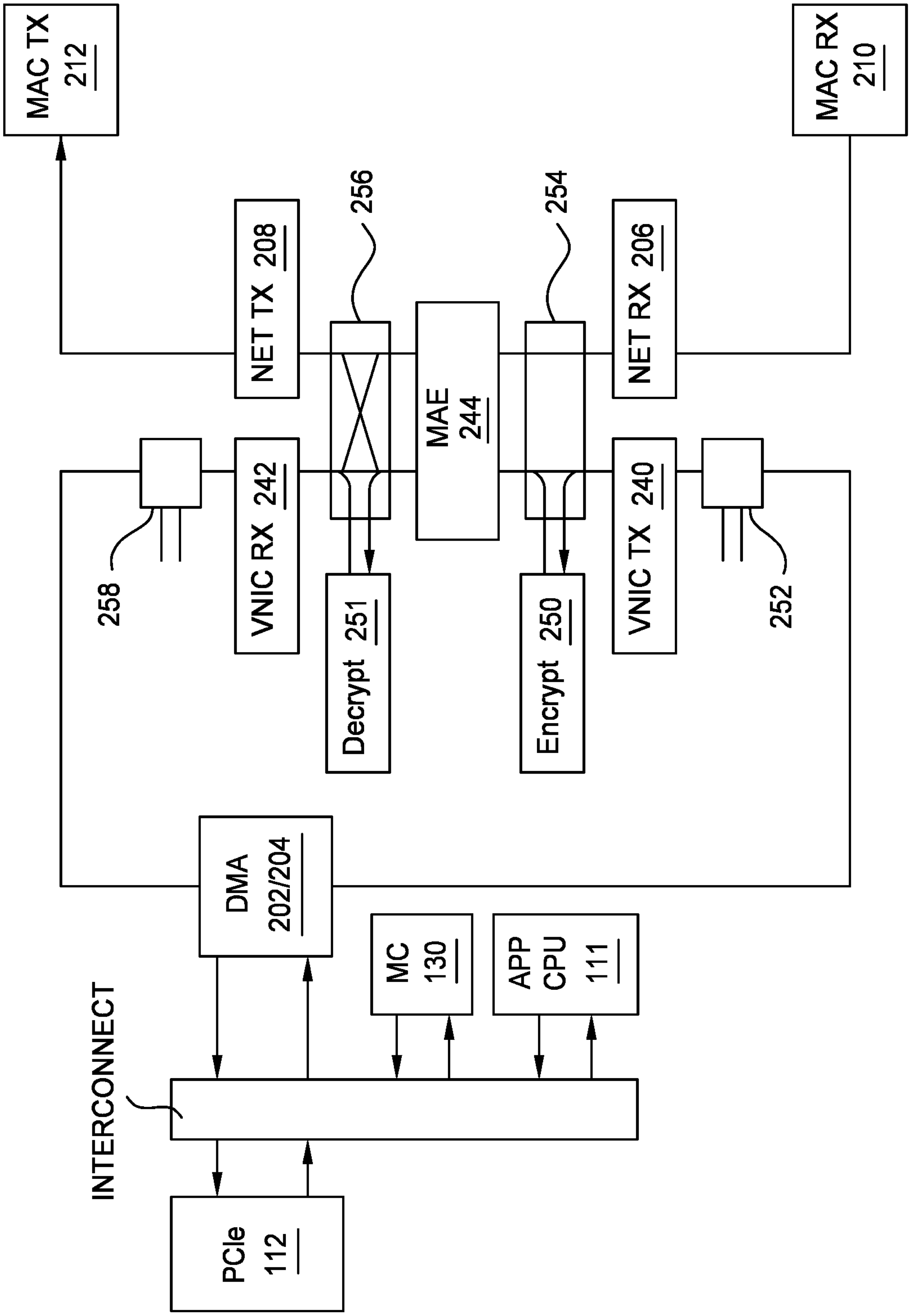
FIG. 5 shows one example of plugins used to provide additionally processing in the streaming subsystem.

Reference is made to FIG. 5 which shows an example where plugins are used to add features to a data path of FIG. 4*a* or *b*. The streaming subsystem is as described in relation to FIG. 4*a* or *b*. In the example shown in FIG. 5, the data path from the VNIC TX engine to the MAE 244 is modified to include an encryption plugin 250 via the second hub 254. The data which is to be transmitted is passed via the hub 254 to the encryption plugin 250. The data is removed from the data path, encrypted by the encryption plugin, and then reinjected to the data path via the second hub.

The data path from the VNIC RX engine 208 to the MAE 244 is modified to include a decryption plugin 251 via the third hub 256. The data which is received is passed via the hub 254 to the decryption plugin. The data is removed from the data path, decrypted by the decryption plugin, and then reinjected to the data path via the third hub.

In this example, the processed data in reinjected to the hub from which is removed. However, in other embodiments, the data may be reinjected into the data path via a different hub.

These plugin points of hubs 254 and 256 may be used for network layer encryption/decryption. Transport layer encryption (e.g. TLS) protocol plugins may use hubs 252 and/or 258. Some embodiments may use both network and transport layer encryptions which use plugins to these hubs. This latter embodiment may be used where double encryption or decryption is required per frame.

The encryption and decryption provided by the plugins may be IPSec encryption and decryption respectively or any other suitable encryption/decryption.

Figure 6:
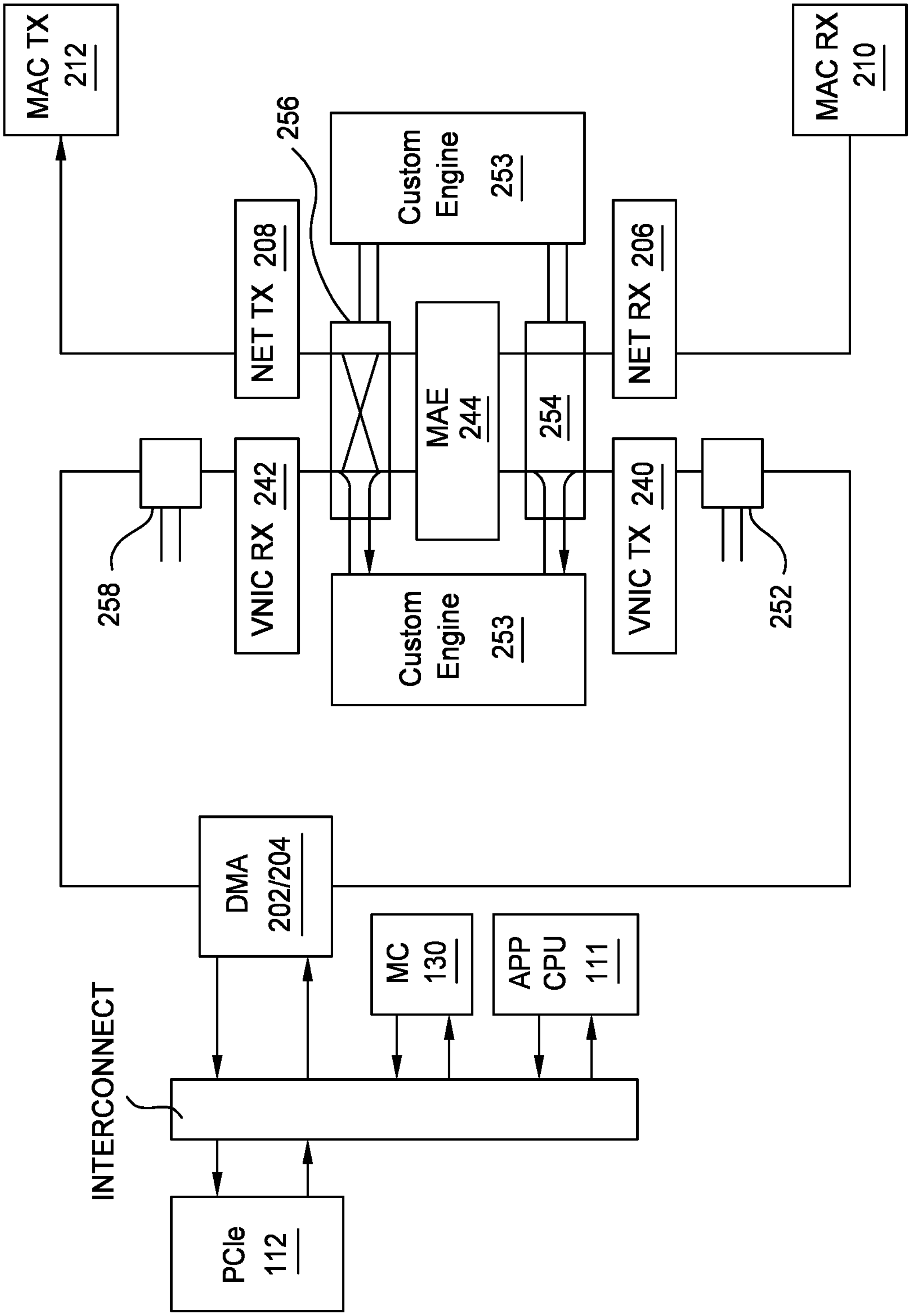
FIG. 6 shows another example where plugins are used to replace a component in the streaming subsystem.

Reference is made to FIG. 6 which shows an example where plugins are used to replace a component of the data path of FIG. 4*a* or *b*. The streaming subsystem is as described in relation to FIG. 4*a* or *b*. In the example shown in FIG. 6, the MAE 244 of the data streaming path is replaced by a custom engine 253.

The transmit path is modified as follows. The transmission of data may be initiated by the host or application CPU which provides one or more entries in one or more DMA transmission queues. The H2C DMA adapter interface 202 will provide an output to the VNIC TX engine 240 via the first hub 252. The VNIC TX engine 240 will provide an output to the custom engine via the second hub 254. The custom engine will provide an output to the NET_TX engine 208 via the third hub 256. The NET_TX engine 208 provides an output to the transmit MAC 212. Thus data is removed via one or more egress plugins of the second hub, processed and reinjected into the data path via one or more ingress plugins of the third hub.

The receive path may be as follows. Data from the network may be received by the receive MAC 210 which provides an output to the NET_RX engine 206. The NET_RX engine provides an output to the custom engine 253 via the second hub 254. The custom engine 253 provides an output to the VNIC_RX engine 242 via the third hub 256. The VNIC_RX engine 242 provides an output via the fourth hub 258 to the C2H DMA adapter interface. Thus data is removed via one or more egress plugins of the second hub, processed and reinjected into the data path via one or more ingress plugins of the third hub.

Figure 7:
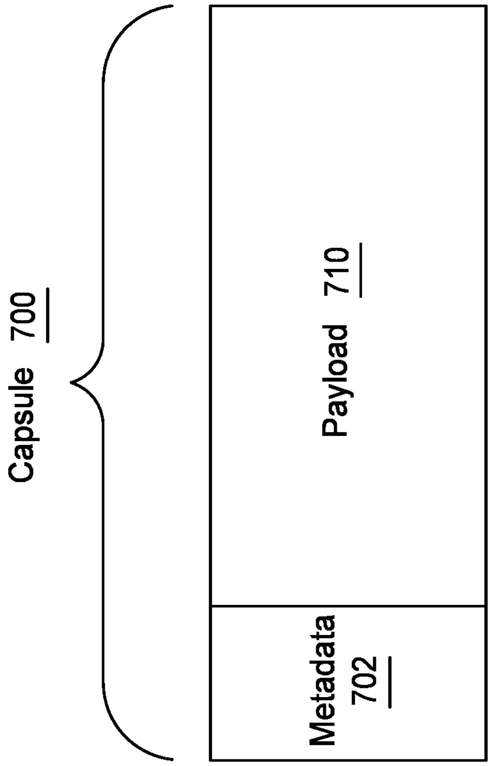
FIG. 7 shows a capsule used in some embodiments.

As mentioned, some embodiments may use capsules. Reference is made to FIG. 7 which shows a capsule used in some embodiments. In some embodiments, the streaming subsystem carries capsules. As will be discussed later, the capsules may alternatively or additionally be used in other parts of the NIC. The capsules may be control capsules or network packet capsules. The payload may be provided by a pointer to a payload. Alternatively the payload may be provided in the capsule.

As schematically shown in FIG. 7, the capsule comprises metadata 702. This may be provided at the beginning of the capsule. This may be followed by the capsule payload 710.

The metadata may depend on whether the capsule is a control capsule or a network capsule.

A network packet capsule has capsule metadata followed by for example an Ethernet frame in the payload.

The metadata may comprise a capsule header which may be common to the control capsule and the network capsule. The capsule header may comprise information indicating if the capsule is a control capsule or a network packet capsule. The capsule header may comprise route information which controls the routing of the packet through the streaming subsystem. The capsule header may comprise virtual channel information indicating the virtual channel to be used by the capsule. The capsule header may comprise length information indicating the length of a capsule.

The network packet capsule will have a network capsule header following the capsule header as part of the metadata 702. This may indicate the layout of the capsule metadata and if the capsule payload includes or not an Ethernet FCS (frame check sequence).

The metadata for the control capsule may indicate the type of control capsule. The capsules may have meta data to indicate offsets. This may indicate the beginning of the data to process.

The schedulers may control the timing of movement of data along the data path. The schedulers may be used to control the timing even when data is processed by one or more plugins. In some embodiments, each stage of the data path may be controlled by a scheduler. In some embodiments, the plug-ins are scheduled by the scheduler.

In some embodiments, the schedulers may use a credit based system.

The scheduler manages the data flow in the streaming subsystem. This data flow comprises the capsules in some embodiments.

A flow has one source and may have one or more destinations. From the scheduler's perspective the flow sources and destinations are memory resources holding data to be sent or space for the data to be received. The destinations may be one or more buffers in a downstream hub and the source may be one or more buffers in a hub and/or plugin of that hub.

A flow source communicates to the scheduler the amount of data it contains and wishes to output. This flow source state is referred as a number of source credits.

Depending on the type of the source the source credits may refer to one of the following:

1) Number of descriptors expressed as a 3-state value:
   a) no descriptors are available
   b) more than zero but fewer than a globally configured threshold number of descriptors are available, and
   c) more than the globally configured threshold number of descriptors are available.

This may be used by the sources which are H2C DMA queues.

2) Number of capsules expressed as a 3-state value:
   a) no capsules are available
   b) more than zero but fewer than a globally configured threshold number of capsules are available, and
   c) more than the globally configured threshold number of capsules are available.

This method may be used by the sources i.e. by FIFOs of hubs.

In some embodiments the amount of credits may alternatively or additionally refer to the amount of data measured in bus transactions (for example 512-bit words).

The flow destination may communicate to the scheduler the amount of free space available to receive the data. This flow destination state may be referred to as a number of destination credits. Depending on the type of the destination the destination credits may refer to one of the following:

1) Amount of data measured in bus transactions (for example 512-bit words). This may be used when the destination is a data buffer (e.g. a FIFO in a hub)
2) A two state value indicating whether a destination can or cannot accept data. This may be used by NET TX ports or NET TX port priority channels.

Based on the state of the flow sources and flow destinations, a scheduler determines which flows are eligible to transfer data. The scheduler evaluates all eligible flows in accordance with its programming and determines which flow can proceed. For example, the scheduler may choose the currently highest priority flow and instruct the flow-source to transmit a block of data of a specific length (scheduler job). The scheduler updates its internal state to better represent the state the system will assume when the job is completed. Doing so may allow the scheduler to issue another job request without waiting for the already issued job to complete.

When the scheduler updates its state, the scheduler predicts the new state of the destination and new priority relationship between the flows. Since the scheduler may not predict the changes precisely, the scheduler may take a pessimistic point of view i.e. it will assume the maximum amount data that may be generated and pushed into the destination as the outcome of the scheduler job request. In some situations the amount of the data written to the destination may exceed (sometimes significantly) the size of the data block specified in the job request. There are also scenarios where the amount of data is smaller than requested or where there is no data transferred at all.

The source executes job requests and send a message to the scheduler for each job completed. This job response message may comprise a cost, source state, and destination credit consumed. The cost informs the scheduler how much throughput resources the job has consumed. The cost depends on the nature and the properties of the job. However, the cost function may be normalized so the costs of the different kinds of jobs can be compared and evaluated by the scheduler, which uses the cost to update priority relationship between the flows. The source state is the new state of the source. Finally, the destination credits consumed refers to the amount of destination space consumed by the data produced during the job.

There are two source arrangements in the arrangement of FIG. 4*a* or *b*: a hub or a DMA adapter.

When the source is a hub, the source is the hub's FIFO and the entity that executes job requests and generates job responses is the hub's read stage. In this arrangement the hub is followed by an engine and another hub. The next hub's FIFOs are the destinations. The engine is able to modify packets thereby reducing or increasing each packet's length. The engine may alternatively or additionally create packets. The maximum amount by which the packet length can be increased may be a globally configured parameter. The source hub read stage when reporting destinations credits consumed may assume that each packet in the job was made longer by the streaming engine by the maximum allowed amount.

The engine may alternatively or additionally create packets. The engine may alternatively or additionally delete packets.

When the source arrangement is a DMA adapter, the source is the DMA queue and the entity that executes the job requests is referred to as the descriptor pipe. The descriptor pipe processes the DMA descriptors and requests a DMA to read or write the data from/to host. The descriptor pipe processes the data. While processing the data the descriptor pipe may resize packets due to TSO (TCP segmentation offload) operation, removing/adding pseudo headers, etc. As in the hub case the descriptor pipe when reporting destinations credits consumed may assume that each packet in the job was made longer by the descriptor pipe by the maximum possible amount.

For both source arrangements described, the entity that resizes the job's data (streaming engine or DMA adapter data pipe) may report any discrepancy between the consumed destination credits specified in the job response and the actual destination credits consumed. This may be accomplished by sending destination credit adjust messages for each packet processed. Each destination credit adjust message carries the difference between the packet's maximum expansion scenario used in the job response and the actual size of the packet. The destination credit adjust message may be issued per packet.

When a source transitions away from empty state to any one of the two not empty states, the source sends a source credit message to the scheduler.

Due to the source specific TX threshold setting, the source may be prevented from notifying the scheduler that it is no longer empty until other conditions are met. Thus, the source credit message notification message may tell the scheduler that the source has transitioned from empty state to not empty below the threshold state or to not empty above the threshold state.

Destinations send destination credit messages to the scheduler indicating that the amount of space in the destination has increased. In some embodiments, to ensure that the scheduler is not swamped with the destination credit messages, a destination may implement a destination credit message moderator which bounds the rate of the destination credit message to a preconfigured maximum rate.

The schedulers issues job requests messages to the sources.

Upon completion of a job request the source issues a job response, the job response specifies:

- Source state: the new state of the source, empty, not empty below threshold, not empty above threshold;
- Destination credits consumed: pessimistic estimation of the amount of destination credits consumed during job execution; and
- Cost of the job.

The engine or DMA adapter descriptor pipe provides a destination credit adjust message for each packet processed. In some embodiments, to ensure that the scheduler is not swamped with the destination adjust credit messages, the stream engine implements a destination credit adjust message moderator which bounds the rate of the destination credit adjust message to a preconfigured maximum rate.

In some embodiments, one or more of the sources may process several jobs in parallel (with at least some overlap).

Each of the schedulers of FIG. 4*a* or 4*b* is generally dedicated to managing a certain related set of sources, destinations, and the flows linking them together. The scheduler's internal configuration and programming specifies how flows are related to the sources and the destinations. In one embodiment, no two flows may share a source, but multiple flows can target the same destination and some flows may target multiple destinations. QoS (policy) may be used by the schedulers to control the sharing of the pipeline bandwidth at the interfaces.

Figure 8A:
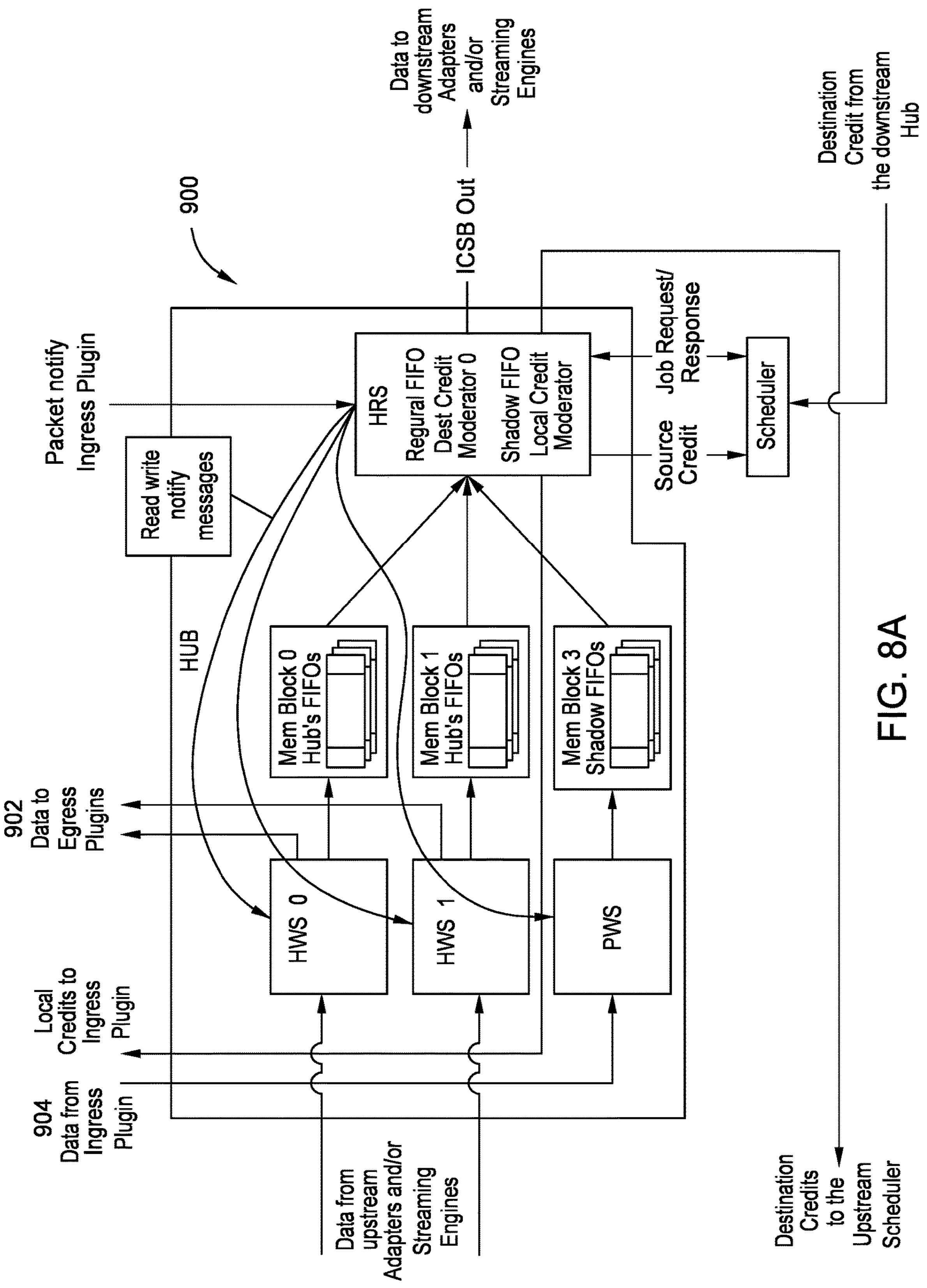
FIG. 8*a* shows a schematic view of a hub architecture used in some embodiments.

Reference is made to FIG. 8*a* which shows a hub of some embodiments. This hub example shown in shown in FIG. 8*a* has two egress plugins 902 and one ingress plugin 904.

Data may be received from an upstream adaptor and/or an engine depending on the position of the hub in the streaming subsystem. The data may alternatively or additionally be received from an ingress plugin.

The hub has write controllers (hub write stages (HWS) and a plugin hub write stage (PWS)). These are referenced HWS 0, HWS 1 and PWS in FIG. 8*a*. Data from the upstream adaptor and/or an engine is provided to the hub write stages and data from the ingress plugin is provided to the plugin hub write stage. The HWS may be provide a demultiplexer function or may be a demultiplexer.

The hub has read controllers (hub read stages HRS) referenced HRS in FIG. 8*a* and buffer memory blocks. These buffer memory blocks are referenced Mem Block 0, 1 and 3 in FIG. 8*a*. The buffer memory blocks may contain circular buffers, thereby abstracting the circular buffer implementation from the rest of the hub design. A buffer memory block may contain one or more circular buffers or any other suitable buffer implementation. The buffers of the buffer memory block may contain capsule data and/or metadata.

The data buffer memory blocks (Mem Block 0 and 1) may implement FIFOs linking the hub's ingress and egress ports. Shadow FIFOs (provided by Mem block 3) may be used to support ingress plugin(s) operation. The shadow FIFOs may rate match the FIFOs used to support egress plugin(s) operation.

Metadata buffer memory blocks may be implemented by FIFOs carrying metadata (capsule length and other fields) and allow the metadata (typically length) to be prefetched ahead of time by the read stage to be written by the write stage at the end of the capsule but read by the read stage at the beginning of the capsule. The metadata FIFOs may be provided in the memory blocks Mem Block 0, 1 and/or 3.

The output of the HWS stages are provided to the egress plugins and/or to the data buffer memory blocks Mem Block 0 and 1.

The read controller HRS incorporates scheduler destination credit message moderators which are responsible for generating scheduler destination credit messages (notifying the respective scheduler about the presence of free space in the hub buffers) at the prescribed rate.

The read controllers also generate source credit messages (notifying the scheduler about presence of data in the hub buffers) as previously described.

The write and read stages may exchange read/write notify messages with each other. The read/write notification message point-to-point links are provided between Read/Write Stages within the same hub. The notify messages inform the recipient controller about each transaction performed by the controller that produces the message i.e. write/read to/from which FIFO and the type of write/read transaction: SOP (start of packet), EOP (end of packet), MIDDLE.

Using the notify messages, each controller is able to keep track of the state of all FIFOs the controller accesses i.e. the number of words, the number of complete packets only, the number of complete and partially read/written packets.

The HRS stage is configured to receive packet notify messages from the ingress plugin. The HRS stage is also configured to provide local credits to the ingress plugin.

Each buffer memory block may hold one or several data buffers and their accompanying metadata buffers. Each hub read or write port may have full ownership of at least one read or write buffer memory block port. In some embodiments no two hub ports may share the same buffer memory block port. Any hub write-read port pair that wishes to pass the data may have at least one buffer memory block in common.

A scheduler is shown. The scheduler is used to control the activity of the HRS. One or more schedulers may control the read stage of other hubs and/or other blocks. The scheduler receives source credit messages from this hub and destination credit messages from one or more downstream hubs and/or one or more other block. The hub sends its destination credit information to one or more upstream schedulers. The HRS stage and the scheduler exchange job request messages and job response messages such as previously described.

Figure 8B:
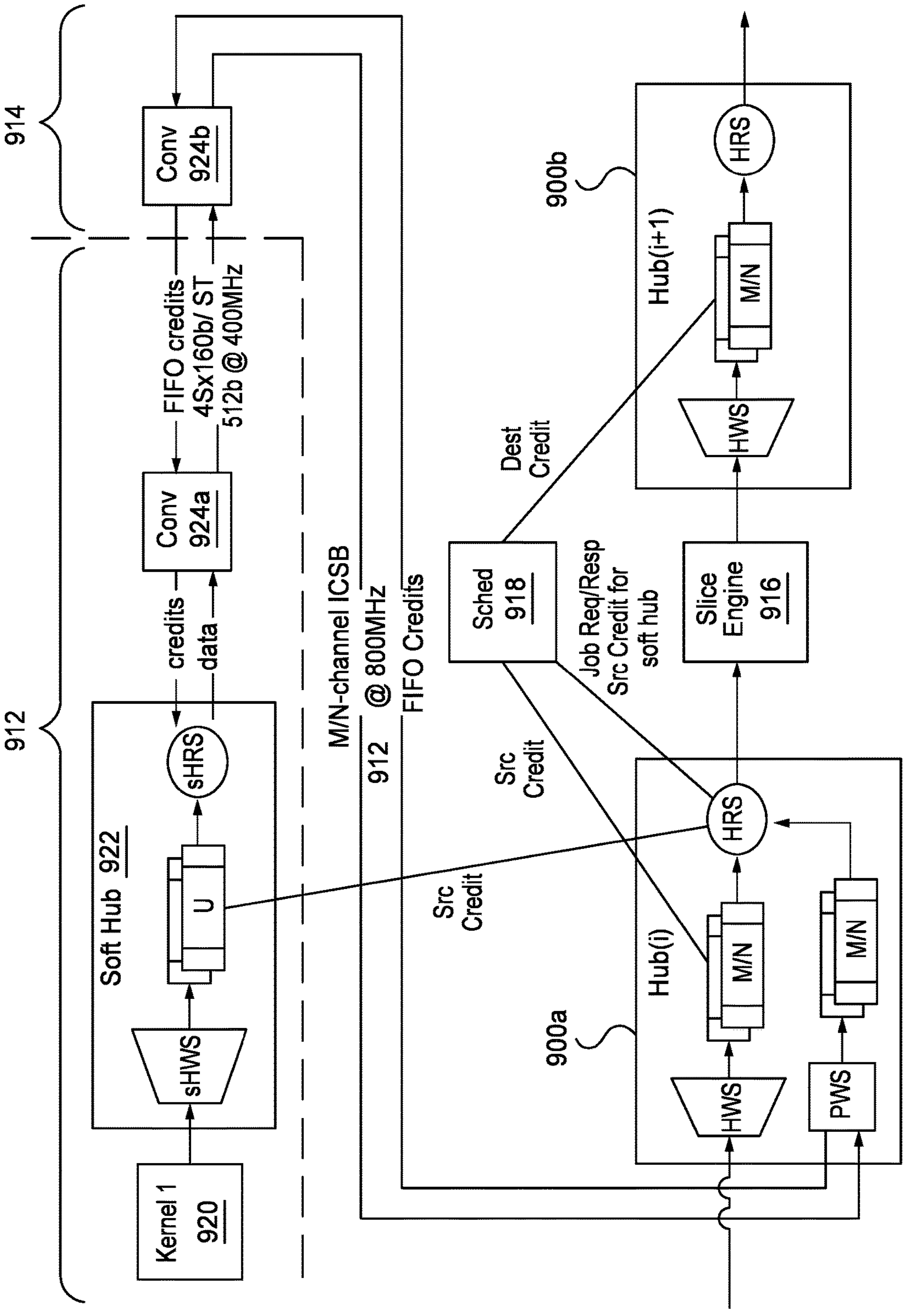
FIG. 8*b* shows an example of an ingress plugin interface integration.

Reference is made to FIG. 8*b* which schematically shows an ingress plugin interface integration. In the example shown in FIG. 8*b*, two hubs 900*a* and 900*b* are shown. Hub 900*a* is upstream of hub 900*b*. Each of the hubs may be as described in relation to FIG. 8*a*. In this example shown, the second hub 900*b* does not have a PWS and associated memory block. If a hub supports an ingress plugin, a PWS and associated memory block may be provided. If not, the PWS and associated memory block may be omitted, as is the case with the second hub 900*b* shown in FIG. 8*b*.

There is an engine 916 between the hubs. This may be any one of the engines discussed previously.

The scheduler 918 may be as shown in FIG. 8*a* and receive the source credits from the first hub. These source credits are received from the HRS of the first hub and are in respect of the FIFOs of the first hub as schematically shown in FIG. 8*b*. The HRS of the first hub also provides job requests and/or job responses to the scheduler.

The HRS of the first hub also provides source credits for the ingress plugin 920. The ingress plugin may be provided by programmable logic part 912 (the programmable logic 113 of FIG. 2*a* for example) of the NIC.

In some embodiments, the ingress plugin may itself be provided with a hub 922. This plugin hub may be referred to a soft hub in that it is provided in the programmable logic part 912 of the NIC and may not be part of the hardened part 914 of the NIC. The hardened part 914 is schematically shown with dotted lines between the hardened area and the programmable logic of the NIC.

The hubs 900*a* and 900*b* may be provided in the hardened part of the NIC. The plugin hub 922 may have the same or similar structure to the second hub 900*b* with an HWS part, memory buffers and an HRS part. The source credit may be provided by the plugin hub and is in respect of the FIFOs of the plugin hub 922.

Data which is provided by the plugin 920 is provided to the first hub 900*a* via the plugin hub and a pair of convertors 924*a* and 924*b*. A first 924*a* of the pair of convertors is provided by the programmable logic and the second 924*b* of the pair of convertors is provided in the hardened part of the NIC. The data is output from the plugin hub to the first convertor 924*a* which converts the data into the required form for the first hub. This may provide the data in the required bus format. The data is passed to the first hub from the first convertor 924*a* via the second convertor 924*b*. In some embodiments, the first convertor provides a first conversion of the data and the second convertor provides a second conversion of the data to the required format for the first hub.

By way of example only, the first convertor converts the data so that is in a ST bus format clocked at, e.g., 400 MHz and the second convertor converts the data into an ICSB bus format clocked at, e.g., 800 MHz.

The second convertor receives FIFO credits from the PWS of the first hub which are provided to the plugin hub via the first convertor 924*a*.

In some embodiments, the convertors may be omitted. In some embodiments, only one convertor is required. In some embodiments, the one or more convertors act as interface between the first hub and the plugin hub or the plugin itself.

It should be appreciated that the convertor 924*b* may be considered to be part of the hub. The plugin 920, the plugin hub 922 and the first convertor 924*a* may be considered to provide the ingress plugin.

The scheduler is configured to receive destination credits from the downstream hub. The scheduler may be provided by computer code running on suitable hardware. The hardware may be at least one processor and at least one memory, for example.

Figure 8C:
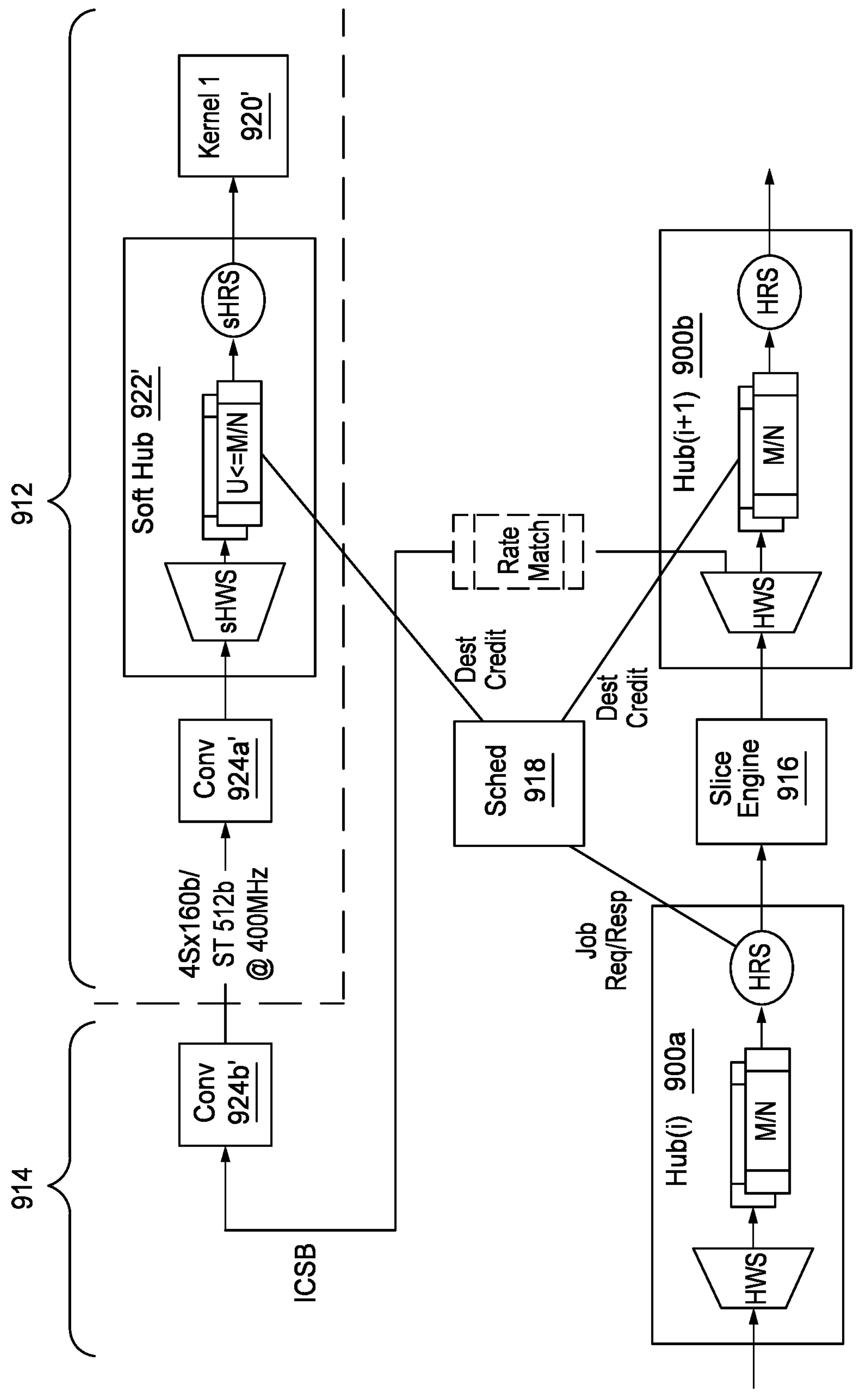
FIG. 8*c* shows an example of an egress plugin interface integration.

Reference is made to FIG. 8*c* which schematically shows an egress plugin interface integration. In the example shown in FIG. 8*c*, two hubs 900*a* and 900*b* are shown such as previously discussed. If a respective hub supports an ingress plugin, a PWS and associated memory block may be provided. If not, the PWS and associated memory block may be omitted.

There is an engine 916 between the hubs. This may be any one of the engines discussed previously.

The HRS of first hub 900*a* provides job requests and/or job responses to the scheduler 918. The scheduler is configured to receive destination credits from the downstream hub 900*b*. The scheduler is configured to receive destination credits from the egress plugin 920'.

The egress plugin 920' may be provided by user logic in the fabric which is indicated by reference 912.

In some embodiments, the egress plugin may itself be provided with a hub 922'. This plugin hub is provided in the programmable logic part 912 of the NIC as discussed in relation to the ingress plugin The egress plugin hub 922' may have the same or similar structure to the second hub 900*b* with a HWS part, memory buffers and an HRS part. The destination credit may be provided by the plugin hub and is in respect of the FIFOs of the egress plugin hub 922'.

Data which is provided to the plugin 920' is provided by the second hub 900*b* via a pair of convertors 924*a'* and 924*b*. This is controlled by the scheduler by use of the egress plugin destination credits. One or more rate match FIFOs may be used. The rate match FIFOs may match bus width and hence data rate. In some embodiments, one rate match FIFO may be provided per egress plugin interface. This may allow a transition from a full width bus between the engine and the second hub and a half width bus interface to the egress plugin.

The first 924*a'* of the pair of convertors is provided in the programmable logic part of the NIC and the second 924*b'* of the pair of convertors in provided in the hardened part 914 of the NIC. The data is output from the second hub 900*b* is provided to the second convertor 924*a* which converts the data into a required form. This converted data may be passed to the first convertor 924*a'*. This first converter 924*a'* may provide the data in the required format for the egress plugin 922'. The data is passed from the second hub to the first convertor 924*a'* via the second convertor 924*b'*. In some embodiments, the second convertor provides a first conversion of the data and the first convertor provides a second conversion of the data to the required format for the egress plugin. By way of example only, the second convertor converts the data from an ICSB bus format clocked at 800 MHz to a ST bus format clocked at 400 MHz and the second convertor converts ST bus format clocked at 400 MHz to a data stream for input to the egress plugin.

In some embodiments, the convertors may be omitted. In some embodiments, only one convertor is required. In some embodiments, the one or more convertors act as interface between the second hub and the plugin hub or the plugin itself.

It should be appreciated that the convertor 924*b'* may be considered to be part of the second hub. The egress plugin 920', the egress plugin hub and the first convertor 924*a'* may be considered to provide the egress plugin.

The scheduler is configured to receive destination credits from the downstream hub.

The scheduler may be provided by computer code running on suitable hardware. The hardware may be at least one processor and at least one memory, for example.

The cache subsystem shown in FIG. 4*a* or *b* may be used by the MAE in some embodiments. The cache subsystem may comprise a cache counter, a look up service and a plurality of cached CAMs. In the example, show in FIG. 6, the MAE is bypassed by the custom engine. This is one example where the cache subsystem is not used by the streaming subsystem. In some embodiments, the memory of the cache may be repurposed. For example, in some embodiments, the memory can be used as one or more of a FIFO (first in first out), a BCAM or a STCAM.

In some embodiments, access to the memory is via the fabric or via the NoC. The CAMs may be designed to be caching in that a miss is forwarded over the NoC to a miss handler implemented in fabric. The miss handler can "extend" the CAM using any suitable memory such as on chip memory or external DDR (double data rate) memory.

Where the memory is repurposed, the streaming subsystem would no longer be able access the cache subsystem.

Thus some embodiments, may allow the cache to be re-used as a CAM when not used as a hardened cache to support the MAE engine.

Figure 9:
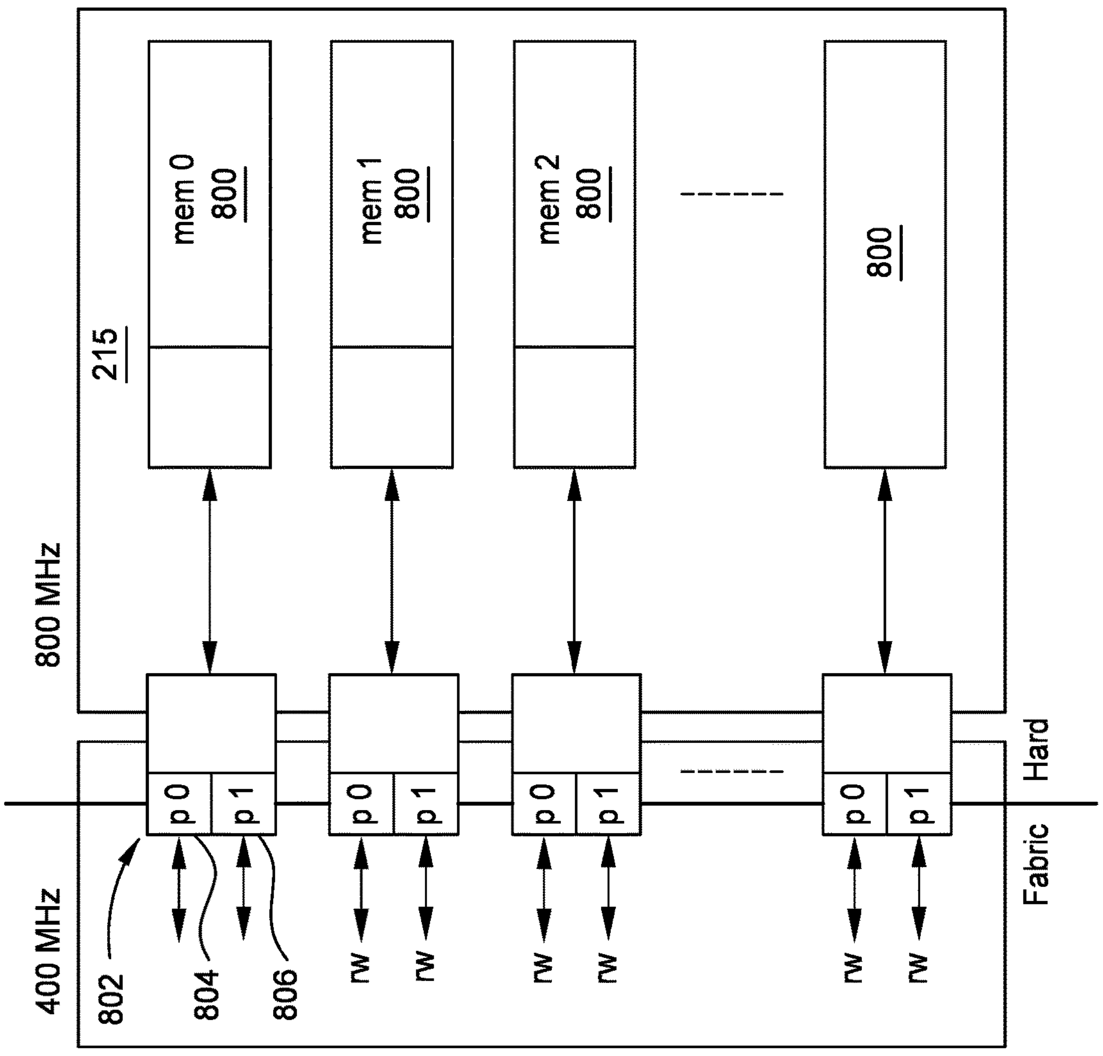
FIG. 9 shows a repurposing of the cache subsystem of the streaming subsystem.

In this regard, reference is made to FIG. 9 which shows the repurposed cache subsystem 215. In some embodiments x memories 800 may be provided. By way of example only, there may be 32 memories 800. In this example, the memories may be 64b wide. However, this is by of example only. Each memory 800 may be associated with a dual port 802. Each port 804 and 806 is able to support read and writes.

In this example there may be 800 M accesses per memory which may give a 1638 Gbit/s total bandwidth. In some embodiments, this may support any required mix of reads and writes.

In some embodiments, the cache memory can be repurposed depending on the application. For example, the memory could be used to provide one of:

4× 200 Gbit/s FIFOs

8×BCAMs with 64b key+values and 800 M lookup/s

1×STCAM, 4 masks, 256b key+values and 400 M lookups

In some embodiments, an on-top an address scheme is provided whereby buffers in the cache can be allocated, freed, and referenced by an address. The buffer addresses may be used as a source/target for DMA and or accelerator commands. Multiplexing of the memories is used to implement the CAM into a set of memory channels, each with a read/write controller. When this mode is active, the memory may not simultaneously be used as a CAM.

The streaming subsystem previously described may omit one or more of the engine described previously and/or to include one or more other engines. One or more functions provided by one or more of the previously described engines may be omitted. One or more other functions may be performed by one or more of the engines described previously.

In some embodiments, there may be one, two, or more crossings of data across the barrier between an ASIC (hardened part) providing the streaming subsystem and the PL providing the plugins. In some embodiments, data may be received from the network and be completely terminated after leaving the streaming subsystem pipeline. In some embodiments, data may be sourced by the PL.

The plugins may be provided one or more of an ASIC, CPU and/or programmable circuitry. A plugin may be a data processing entity. It should be emphasised that whilst a plug in may be provided by programmable logic or programmable circuitry in some embodiments. In other embodiments, one or more plugins may be provided by any other suitable circuitry such as an ASIC, CPU or any other circuitry.

In some embodiments, the processing engines may be programmed to provide the required functions. Programming of the processing engines may be using any suitable programming language such as RTL, C, P4, and eBPF.

Some embodiments may provide a network interface device comprising a streaming data processing path. The streaming data processing path may comprise one or more data processing engines and data hubs. One or more of the data hubs comprises one or more of a data ingress interface configurable to receive data from a data processing entity provided by programmable circuitry and a data egress interface configurable to provide data to a data processing entity provided by programmable circuitry. The network interface device may comprise a scheduler associated with a respective hub to control an output of data by the respective data hub to a respective data processing engine. At least one data hub may be arranged upstream of a respective data processing engine on the data processing path and is configured to receive data from one or more upstream data path entities and from a respective data processing entity. The scheduler is configured to schedule the output of data by the respective hub to the respective data processing engine. The respective data processing engine is configured to receive data from the respective upstream data hub, process the received data and output the processed data to a respective hub arranged downstream of the respective data processing engine.

The data processing entity may alternative be provided by circuitry other than programmable circuitry. The data processing entity may be proved by an ASIC, by a CPU or by any other suitable circuitry.

Figure 16:
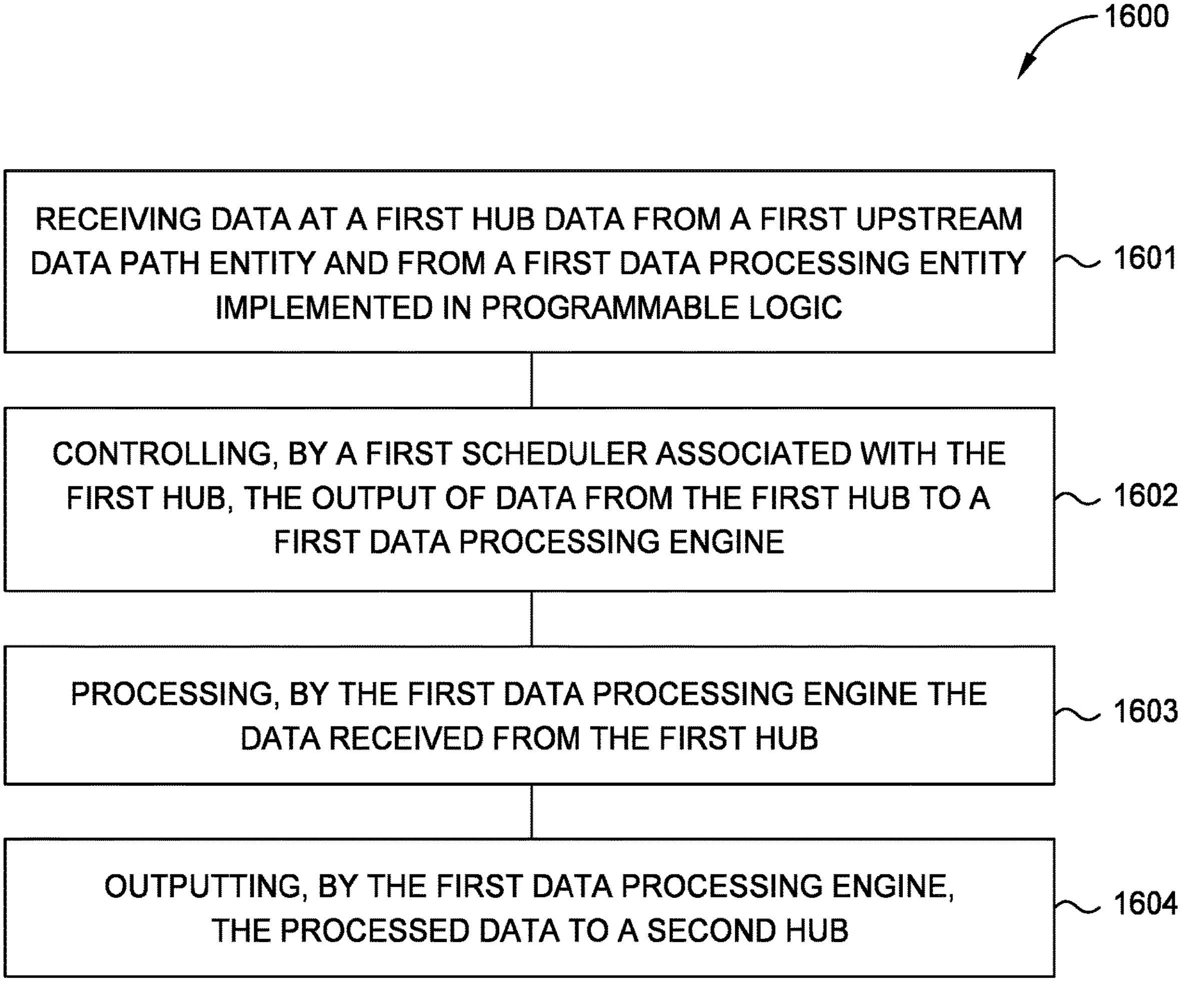
FIG. 16 shows another method of some embodiments.

Reference is made to FIG. 16 which shows a method of some embodiments. This may be performed in a network interface device.

The method comprises in step 1601, receiving data at a first hub data from a first upstream data path entity and from a first data processing entity implemented in programmable circuitry.

The method comprises in step 1602, controlling, by a first scheduler associated with the first hub, the output of data from the first hub to a first data processing engine.

The method comprises in step 1603, processing, by the first data processing engine the data received from the first hub. and The method comprises in step 1604, outputting, by the first data processing engine, the processed data to a second hub.

Figure 10:
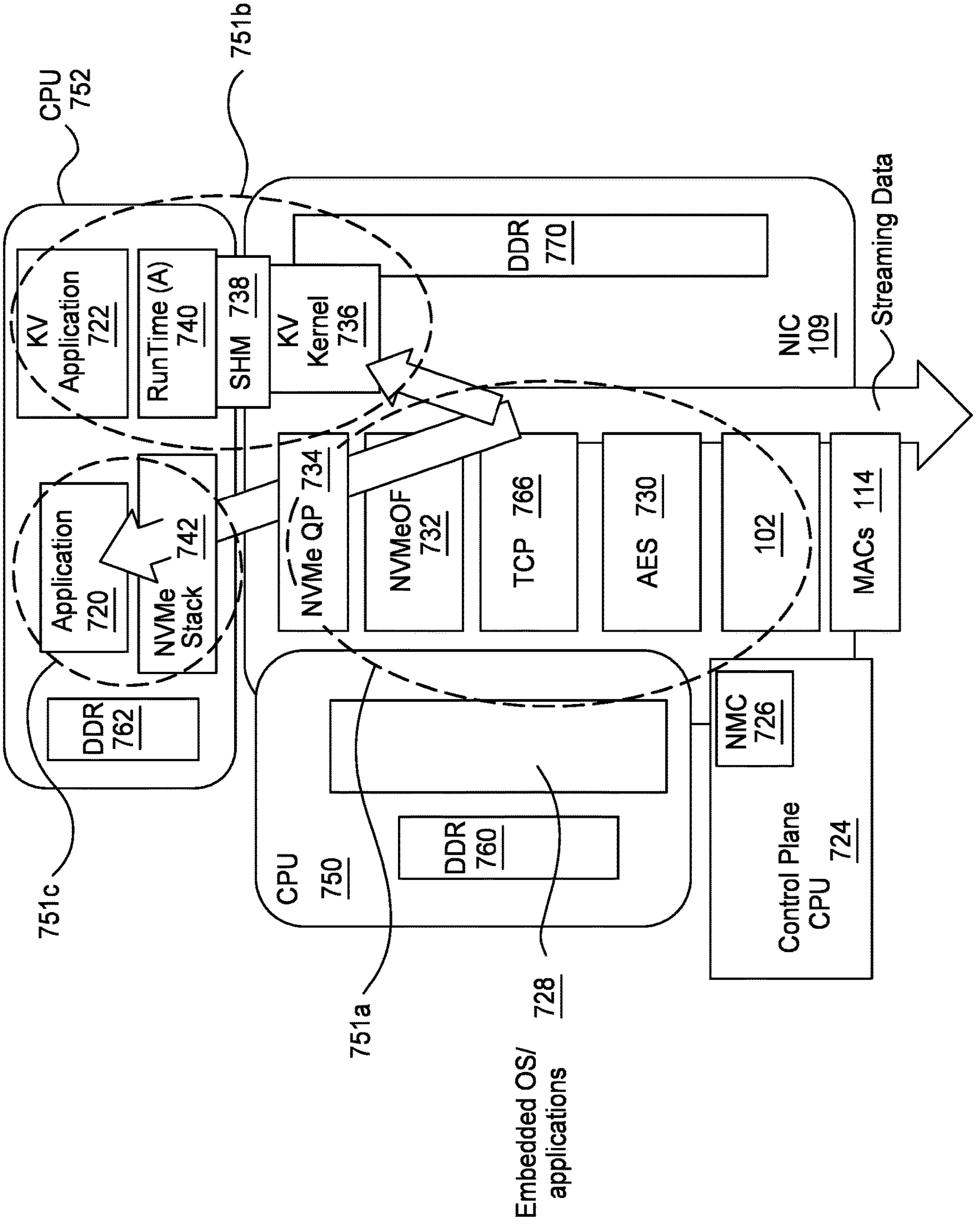
FIG. 10 shows different domains of trust of a network interface device of some embodiments.

Reference is made to FIG. 10 which shows the NIC 109 with two CPUs 750 and 752. In practice, the CPUs may be CPU complexes. A CPU complex comprises a given number of CPU cores with their CPU caches and interconnect. The first of these CPUs 752 may be a host CPU. The second of these CPUs 750 may be an application CPU running embedded operating system and/or applications 728. Firmware 724 may provide the control plane functions for the NIC. The firmware may be on a low powered CPU such as a reconfigurable processing unit RPU. This will be referred to the control plane CPU 724.

In some embodiments, CPUs 750 and 752 are provided by separate CPUs. In other embodiments, these CPUs may be provided by a common CPU. In some embodiments, one or both of these CPUs may be provided as part of the NIC. In other embodiments one or both of these CPUs may be provided by a host device. In the example shown in FIG. 10, the two CPUs are separate CPUs. The first is a host CPU 752 and the second is a CPU 750 provided as part of the NIC.

The control plane CPU 724 may be separate from the CPUs. In some embodiments, the control plane CPU may be provided as part of the second CPU 750. The control plane CPU 724 may be part of the NIC. However, in some embodiments, the control plane CPU may be at least partially implemented in the host.

As previously discussed, streams of data are received/transmitted by the NIC. The streams of data may be received from the network or transmitted onto the network. Different ones of the streams of data will be associated with different flows. The different flows may be identified by for example an IP address, a socket, and a port number.

The NIC may have a number of different streaming kernels provided by a respective module. A streaming kernel may process the received data. A streaming kernel may pass the processed data to a next streaming kernel. This will be discussed in more detail later.

The data which is received from the network may be received by a MAC module 114. The MAC module will perform MAC layer processing on the received data. The MAC module will provide an output to the virtual switch such as previously described. The output may comprise the MAC processed data.

The MAC processed data is processed by the virtual switch part (vSwitch) 102 of the NIC. The virtual switch may be provided by at least a part of the streaming subsystem described previously. The processing which is performed may be dependent on the plugins which are used. The processing may be as previously described. The vSwitch may provide an output to an AES (advanced encryption standard) module 730 when the vSwitch has processed the data. The output may comprise the processed data.

When the AES (advanced encryption standard) module 730 receives the output from the vSwitch, the AES may be configured to decrypt the processed data. In response to the performing of the decryption, the AES module may provide an output to the TCP module 766 or kernel. The output may comprise the decrypted data.

It should be appreciated that in some embodiments, at least a part of the AES function may be provided by a plugin to the vSwitch.

In this example, reference has been made to an AES security function. It should be appreciated that this security can be any other suitable security function such as ChaCha20-Poly1305 or Salsa20 and/or the like. The security function may implement a cryptographic algorithm and/or to enable processing of custom network protocol headers in order to determine the crypted data or to derive a key. In some scenarios, the security function may be omitted.

In some embodiments, an intermediate module may be provided which parses the data to determine the blocks and keys that should be used for the AES operations. That intermediate module may be provided as a plugin to the vSwitch.

The TCP module 766 is configured in response to that output from the AES module to perform the required TCP related processing on the decrypted data such as for example processing of the TCP header. In other embodiments, a different protocol module supporting a different protocol to TCP may alternatively or additionally be provided.

In some embodiments, the TCP module 766 may perform all the required TCP protocol processing. In other embodiments, the TCP module may be omitted and the TCP processing may be performed elsewhere. In some embodiments, the TCP module may perform only a part of the TCP processing. For example, the TCP module may only perform reassembly and forward headers to a software TCP implementation. This may be provided by for example by an accelerated network stack such as Onload provided by the applicant on the application processing unit. This is discussed later.

The TCP module may be provided by a plugin and/or by one or more of the engines of the streaming subsystem. This may depend on the TCP related processing which is to be performed in the NIC. As mentioned previously, all or part or none of the TCP processing may be performed in the NIC.

Depending on the context or address associated with the data, an output is provided by the TCP module either to a key value KV module 736 or a NVMeOF (non-volatile memory express over fabrics) module 734. This output provided by the TCP module may comprise the protocol processed data. It should be appreciated that the KV module 736 and the NVMeOF module 734 are two examples of different modules which may be provided. However, it should be appreciated that one or more other modules may be used instead of one or more of these example modules. In some embodiments there may be more than two modules or only one module. This may be dependent on the number and/or type of applications supported.

In this example, the KV module and the NVMeOF module are downstream of the TCP module in the receive direction. In other embodiments, one or more modules may be provided in parallel to the TCP module and/or upstream of the TCP module in the receive direction.

In some embodiments, one or both of the KV module and the NVMeOF module may be provided as plugin modules to the streaming subsystem.

In some embodiments, the default is to provide an output to one of the modules unless the data is associated with one or more particular data flow. In this example, the default module may be the NVMeOF module 734 and only data with associated with one or particular data flows is provided to the KV module 736. A particular data flow may be, for example, identified by its address information.

In other embodiments, both of the modules may be associated with respective data flows and only if the data is associated with a respective data flow is the data output to respective module. A given data flow may in some embodiments only be directed to one module. However in other embodiments, a given data flow may be directed to two different modules.

The interface between the TCP module and the KV module is such that an output is only provided for data associated with one or more particular data flows from the TCP modules to the KV module. This interface will be discussed in more detail later. Likewise, the interface between the TCP module and the NVMeOF module is such that an output is only provided for data associated with one or more particular data flows from the TCP modules to the NVMeOF module.

The NVMeOF module 732 will perform its function with respect to the protocol processed data in response to the output from the TCP stack and provide an output to the NMVe stack 742 in the first CPU 752 via the NVME queue pair supporting OS stack 734 in the NIC. This NVME queue pair supporting OS stack 734 may be provided by one or more vNICs in the PCIe function such as previously described or may be provided as part of the NVMeOF module 732.

This output to the NVMe stack 742 may comprise the data which has been processed by the NVMeOF module 732. The NVMe stack 742 provides an output to the associated application 720 in the first CPU that is the host CPU.

The KV module 736 provides an output to a SHM shared memory interface 738. The SHM interface 738 may be provided by one or more vNICs in the PCIe function such as previously described or may be provided as part of the NVMeOF module 732.

An output is provided to a KV application 722 via the SHM interface and an API 740. The API 740 may be provided by a runtime library. The API 740 and the KV application 722 may be provided on the first CPU.

In some embodiments, the applications 720 and 722 may be supported by different CPUs.

In some embodiments, the processing provided by a module may change the type of data. For example, the output from the vSwitch is a data unit which corresponds to Layer 2, 3 (Ethernet frame+IP processing) processing. The output from the TCP stack module is a reliable in-order byte stream. The output from the NVMeOF module may be an NVMe block storage level transaction. The post TCP byte stream may be interpreted by the KV application as a get or set request.

It should be appreciated that the memory locations that a given process or context (address space on the CPU) may access depend on the privilege level associated with that process or context. Different applications supported by the CPU may be associated with different address space. The address space for the application may depend on the privilege of that application.

The previous discussion has been with respect to the processing of the data received by the NIC. The applications may alternatively or additionally be configured to cause data to be put onto the network. The data may be read from a respective memory location. The memory location may be in address space associated with the respective application. It should be appreciated that the data may alternatively or additionally be a message. By way of example, the message may be a request message, a response message, a query message, or any other suitable message.

The data from the NVMe application 720 is passed to the NVMeOF module 732 via the NVMe stack 742 and the NVMe QP supporting OS stack 732. These entities process the data as required. The processed data may be output to the TCP module 766.

The data from the KV application 722 is passed from the API 740 and SHM interface 738 to the KV module 736 which process the data as required. The processed data may be output to the TCP module 766.

The TCP module 766 receives the data from the NVMeOF module 732 and/or the KV module 736. In some embodiments, the TCP module 766 may be configured only to accept data from a given one of those modules if that data is associated with one or more particular data flows. This will be described in more detail later.

The TCP module 766 is configured to perform the required TCP related processing on the data received from either of the KV module 736 or the NVMeOF module 732. The protocol processed data is output to the AES module 730.

The AES module 730 may be configured to encrypt the received data. The AES module may output the encrypted data to the vSwitch 102. The AES module may itself be wrapped by a module to implement the protocol parsing required to determine the data block and key material from the network header information, or vice versa.

The vSwitch may process the encrypted data. The processing provided by the vSwitch may be dependent on the plugins of the NIC. One or more of the modules of the NIC shown in FIG. 10 may be provided as plugins to the streaming subsystem, such as previously described.

The vSwitch is configured to output the processed data to the MAC module for MAC processing. The data may be put onto the network.

The vSwitch may be described previously, for example such as shown in FIGS. 4*a* and 4*b*. However, in other embodiments, any other suitable NIC arrangement may be provided. That NIC arrangement may not have the functionality to support one or more plugins such as previously described.

A network management controller NMC 726 may be provided by the control CPU 724. The NMC 762 is configured to control which data flows are processed by which module. The NMC will program the modules to ensure that only the data flows of the respective address space are processed by a given module.

In some embodiments, the NMC 762 controls the steering of different flows in the NIC.

In some embodiments, different end users may require different applications to be supported by the NIC. As mentioned previously, the NVMe application and the KV application are examples of such applications which may be required to be supported. Other embodiments may alternatively or additionally one or more other applications may be supported. The different applications may require one or more respective modules to be supported and/or one or more hardware parts of the NIC to be allocated to support a particular application. The allocation of the resources required to support the application is controlled by the NMC 726. The resources allocated for the particular application may be kept separate from the resources allocated for another application and/or other resources required to support different functions such as protocol functions and encryption/decryption functions.

In some embodiments, the hardware resources may be at least partially provided by the programmable logic or programmable circuitry.

One or more hardware resources may be dedicated to, for example a particular application such as previously described. Alternatively or additionally one or more hardware resources may be shared by two or more applications. An example of a shared resource is memory where physically all accesses are via a memory controller. In the case of a shared resource the allocation will be based on a region or slice of the hardware (a range of addresses) and/or one or more other properties which may be required such as a bandwidth or a priority. Together all the shared and dedicated resources may be considered as an address space.

One or more of the previously discussed modules may be dynamically loaded by the NMC.

A module may be hardware on the NIC which implements a hardware accelerated application function. As noted previously, a kernel may be provided by a respective module and may be application specific as they implement a function of the application and applications are potentially different. A module may be associated with more than one kernel in some embodiments.

The function may be of a user-space application. By way of example only, such a function could be a Key Value database.

The function may be of an operating system application. By way of example only, such a function could be a firewall.

The function may be of a hypervisor resident application. By way of example only, such a function could be a virtual switch.

The hardware kernels provided by a respective module need to mirror the same isolation/privilege properties of the respective one or more functions such as discussed above.

An interface between an application and a kernel may be provided by a shell like interface or any other suitable interface. In some embodiments, this interface may be implemented by a combination of firmware and hardware which provides a software API to the kernel and a hardware API for the kernel. This interface may be provided by isolation circuitry. This isolation circuitry may be provided by the combination of firmware and hardware. The interface provided may depend on the operating system technology used by the NIC. The interface may be considered to be associated with a hardware address space. This hardware address space may comprise one or more of programmable logic, DDR, and CPUs. A kernel connects an application (via the interface) to the hardware on the NIC.

A kernel may be loaded into an area of memory. As mentioned previously, a module may comprise one or more kernels and the respective interfaces. This area of memory may be protected from access by the application program at least. The kernel performs tasks such as running processes, managing the hardware required to support the application and handling interrupts. The hardware required may be CPU, memory, peripheral devices and/or the programmable logic of the NIC. The hardware will be in the hardware address space of the shell.

The application is running on host (first) CPU.

In some embodiments, loadable kernels may be inserted and removed at run time. The kernels may be any suitable type of kernels. In some embodiments the kernels may be functions (components) of applications which have been compiled to execute in hardware.

The different kernels may be associated with different areas of privilege or trust. Different areas of trust may be set up for different data flows/applications. This allows different address spaces to be isolated from one another. The different address spaces or flows may be associated with different hardware resources on the NIC and those different hardware resources are isolated from one another. The kernels to support different applications may be associated with different interfaces. In the arrangement of FIG. 10, three different areas of trust or privilege are shown in by dotted lines and are referenced 751*a*, 751*b* and 751*c*.

The vSwitch, AES, TCP and NVMeOF modules may be associated with a first area of trust 751*a*. This means that this area is associated with a first domain of privilege.

The KV modules, the KV application, the SHM and API are associated with a second area of trust 751*b*. This means that this area is associated with a second domain of privilege.

The NVMe Stack and the associated application may be associated with a third area of trust 751*c*. This means that this area is associated with a third domain of privilege.

Generally the second and third areas are kept separate from one another such that data cannot be pushed from one of second and third domains of trust to the other of the second and third domains.

Thus, in some embodiments, different areas or domains of privilege or trust are provided for different data flows and/or applications. The different areas of privilege or trust can be considered to be associated with a one or more modules. In the examples previously described an interface may be provided by a module. In some embodiments, a common interface may be shared by one or more modules.

Figure 11:
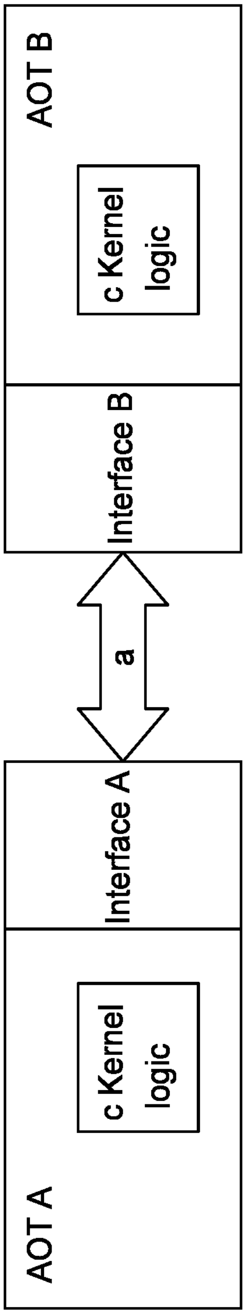
FIG. 11 shows the isolation of two areas of trust, one from the other.

Reference is made to FIG. 11. FIG. 11 shows a first area of trust (AOT), AOT A, and a second AOT, AOT B. It should be appreciated that the areas of trusts are isolated from one another. In this example, each area of trust is associated with its own address space. Each of these areas of trusts is provided in the NIC.

In this example, there is no overlap in the address space associated with each area of trust. Each area of trust may be associated with a given level of privilege. The levels of privilege may be the same or different. Where a hardware resource such as a memory is shared between areas of trust, the resource may be partitioned such that only the portion accessible by the respective shell or area of trust is visible (and accessible) to that shell or area of trust. The hardware in one shell or area of trust has no knowledge or access to hardware (the wires, logic etc.) in a different shell or area of trust. This may extend to debug and/or diagnostic tools, and the software compilers used to generate and link this hardware as well as the one or more kernels of an area of trust.

The resource usage is shared according to system policy. In a CPU for example an MMU (memory management unit) may perform this memory virtualisation function. In the NIC, the applications and the associated hardware kernels may be dynamically created and so no single hardware element can virtualize all possible area of trust combinations.

In some embodiments, it is possible that address spaces are shared. This may require that there are resource specific protections to enforce privilege (such as an MMU for a shared physical memory).

The address space in the NIC may be controlled by the NMC 726 in some embodiments.

The address space of the area of trust may encompass one or more accelerator engines, programmable logic of the NIC and/or local memory.

At run time, a communication channel between the two areas of trust is created. This communication channel may be a bus or similar communication channel. By way of example only, the communication channel may be an AXI-B bus. The bus is referenced a.

Once the communication channel has been created, isolation circuitry is set up. Each of the areas of trust is provided with an interface, such as previously described. AOT A has an interface, interface A and AOT B has an interface, interface B. Each of these interfaces is provided with respective isolation circuitry. This isolation circuitry may provide a function which is analogous to that provided by a system call handler function. For example, this function may check data validity and/or handle lower level issues such as unexpected bus transaction terminations if a module is reset or removed. The function provided by the isolation circuitry will depend on the relative privilege associated with the respective area of trust. The system call handler type functionality effectively allows the interaction between the application and the kernel. One kernel in one domain of trust is prevented from directly reading and writing to another kernel's address space where that kernel is in a different domain of trust.

Once the isolation circuitry has been set up, the kernel logic corresponding to the respective address space is loaded. This is referenced c. This kernel logic may be associated with one or more kernels. The isolation circuitry may be associated with a specific one of the modules or kernels of an area of trust. This may be an entry point module of the area of trust and/or an exit point module of the area of trust.

The isolation circuitry which is provided may depend on the relative privilege associated with each area of trust. In this regard, reference is made to FIGS. 12*a* and 12*b*.

Figure 12A:
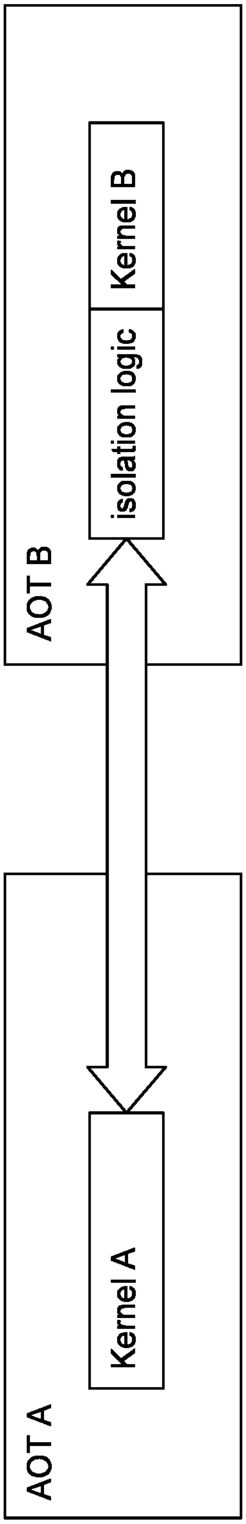
FIG. 12*a* shows an example of two areas of trust with a different level of privilege.

In FIG. 12*a*, AOT A is associated with a lower privilege than AOT B. This corresponds to the example of FIG. 10 where AOT A would comprise the KV kernel and AOT B would comprise the vSwitch, the AES kernel, the TCP kernel and the NVMeOF kernel. In this case the controlling or master isolation circuitry would be provided within AOT B. In particular, the interface with AOT A would be with the TCP kernel via the created communication channel. The isolation circuitry may be provided to ensure that only data associated with the particular flows which are to be directed to the KV kernel are in fact directed to the KV kernel. The isolation circuitry may be provided between the output of the TCP kernel and the bus. In some embodiments, the isolation circuitry may be integrated into the kernel.

Alternatively or additionally, the isolation circuitry may cause any unwanted data flows from AOT A to be discarded.

In some embodiments, isolation circuitry may be provided in each AOT to cope with hardware level issues when the modules are removed/reset. This can happen to either side regardless as to the privilege. This removal or insertion of a kernel may occur at any time, if required. In other words, a kernel may be inserted or removed during the running of the system.

Figure 12B:
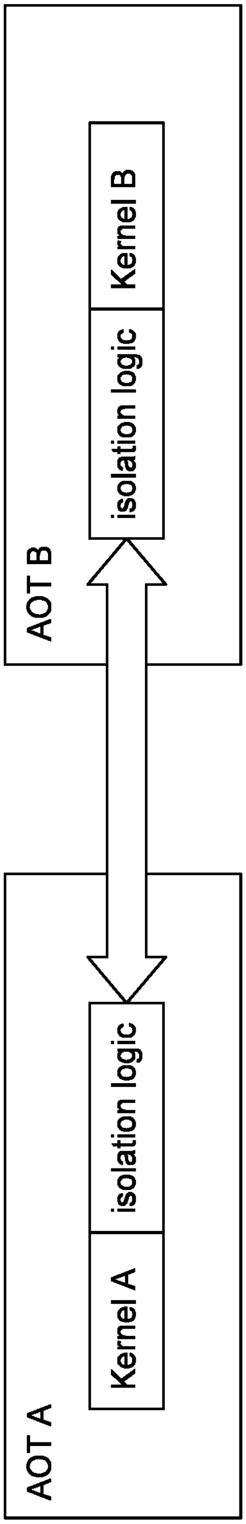
FIG. 12*b* shows an example of two areas of trust with a same level of privilege.

In FIG. 12*b*, AOT A is associated with the same privilege as AOT B. In this case the isolation circuitry provided within AOT B and within AOT A are of equal weight. The isolation circuitry in AOT B may be provided to ensure that only data associated with the particular flows which are to be directed to kernel A are in fact directed to kernel A. The isolation circuitry in AOT A may be provided ensure that only data associated with the particular flows which are to be directed to kernel B are in fact directed to kernel B.

Alternatively or additionally, the isolation circuitry in AOT B may cause any unwanted data flows from AOT A to be discarded. Alternatively or additionally, the isolation circuitry in AOT A may cause any unwanted data flows from AOT B to be discarded.

Isolation circuitry may enforce data values such as header bits (e.g. that IP source address bits) to ensure that they are correct. This isolation circuitry enforcing the data values may be in the area of trust outputting the data values and/or in the area of trust receiving the data values.

Isolation circuitry associated with a particular area of trust may modify the data which is received by a respective area of trust so as to be in a form used by the respective area of trust. Isolation circuitry associated with a particular area of trust may modify the data which is output by a respective area of trust so as to remove parts of the data which are only required within the respective area of trust.

The isolation circuitry used by the respective area of trusts maybe configured to be add and/or remove data such as an encapsulation used only within the privileged domain, that is the respective area of trust.

Isolation circuitry may enforce that bus protocols are properly adhered. This may be on the links between areas of trust for example. For example the isolation circuitry may ensure that AXI transactions are properly terminated, for example where one side is being reset or removed, and/or within limits (length).

Alternatively or additionally, the isolation circuitry may ensure that credit based flow control and scheduler interfaces are correctly operated. Some enforcement by the isolation circuitry may be optional depending on the operating environment of a specific area of trust.

Thus when a kernel is loaded onto the NIC, one or more hardware linkers or communication links which connect the kernel to other kernels are provided. These hardware linkers are such that only data associated with the allowed network flows can be received and/or output. The loading of the kernel will allow one or more hardware resources to be addressable for a given address space The address space associated with a given application may comprise address space provided by the NIC. Different address space will be associated with different applications. Due to the different areas of trust, one application may be prevented from accessing resources associated with a different application. An address space may be dynamically constructed for a given application address space/area of trust. The address space may include CPU resources. Thus areas of trust may be considered to be an extension of the CPU address space construct used to provide isolation for software applications running on a CPU. An area of trust may therefore provide isolation for hybrid hardware and software applications executing on a combination of different hardware including CPUs.

It should be appreciated that the data-plane accelerator functions such as the AES module and the vSwitch may be logically represented as streaming kernels. These kernels are considered to be part of the same area of trust as the TCP kernel and provided in the same area of trust.

The NMC 726 may provide a software defined network on the NIC which defines capsule routing over the kernel topology. The capsules will be associated with respective network flows and the capsules are routed in accordance with the associated network flow. The capsules may be as previously described.

The NMC 726 is configured to allow the NIC hardware to be used by different areas of trust. That hardware used by a respective area of trust comprises one or more of the fabric (reconfigurable logic), accelerators, network interfaces and CPU (embedded and/or external). The NMC is configured to provide different protection domains or areas or trust. The control plane comprise a runtime function. This runtime function controls the dynamic loading of the kernels such as described in relation to FIG. 10.

In this example, a common TCP module is provided for the two applications. In other embodiments, a TCP module is provided for each application.

The AES module(s) may be omitted in some embodiments. In other embodiments one or more different encryption modules may alternatively be used.

The modules which are shown in FIG. 10 are by way of example only. In other embodiments, one or more modules may be omitted. One or more alternative modules may be provided. There may be at least one shared module shared by two or more applications of different domains of trust and/or at least one dedicated module provided which is dedicated to one or more applications in the same domain of trust. The one or more dedicated modules may be closer to the application than the one or more shared modules in the data path.

A module may be regarded as a set of hardware resources of the NIC which are configured to provide the module function. This may be to provide a kernel. These resources may be one or more of the fabric (reconfigurable logic), accelerators, network interfaces and CPU (embedded and/or external). By way of example only, a module may be provided by the programmable logic or by any other suitable hardware. In some embodiments, the module may be provided by configurable hardware. The module may be configured to run computer code in order to provide the required function of the module. The module may comprise or have access to memory. That memory may for example store the computer code.

In some embodiments, a dedicated module may be shared by two applications where those two applications share the same domain of trust.

A shared module would serve two or more different domains of trust where each domain of trust is associated with one or more applications.

In the previously described examples, one or more of the kernels or modules have been described as being provided by plugins to the streaming subsystem. It should be appreciated that in other embodiments, the streaming subsystem architecture such as previously described may not be used. In this latter example, the modules may be provided in streaming receive path for receive data and/or a streaming transmit path for the transmit data. Such a streaming path may include one or more of the engines previously described. However, the hubs and their associated schedulers may be omitted in such an example as the streaming path may be constructed to process the data in order.

In other embodiments, an FPGA (or other programmable logic) may support a service scenario. For example one area of trust would include monitoring and billing and private networking for the infrastructure provider and another area of trust could include all other hardware resources.

Figure 17:
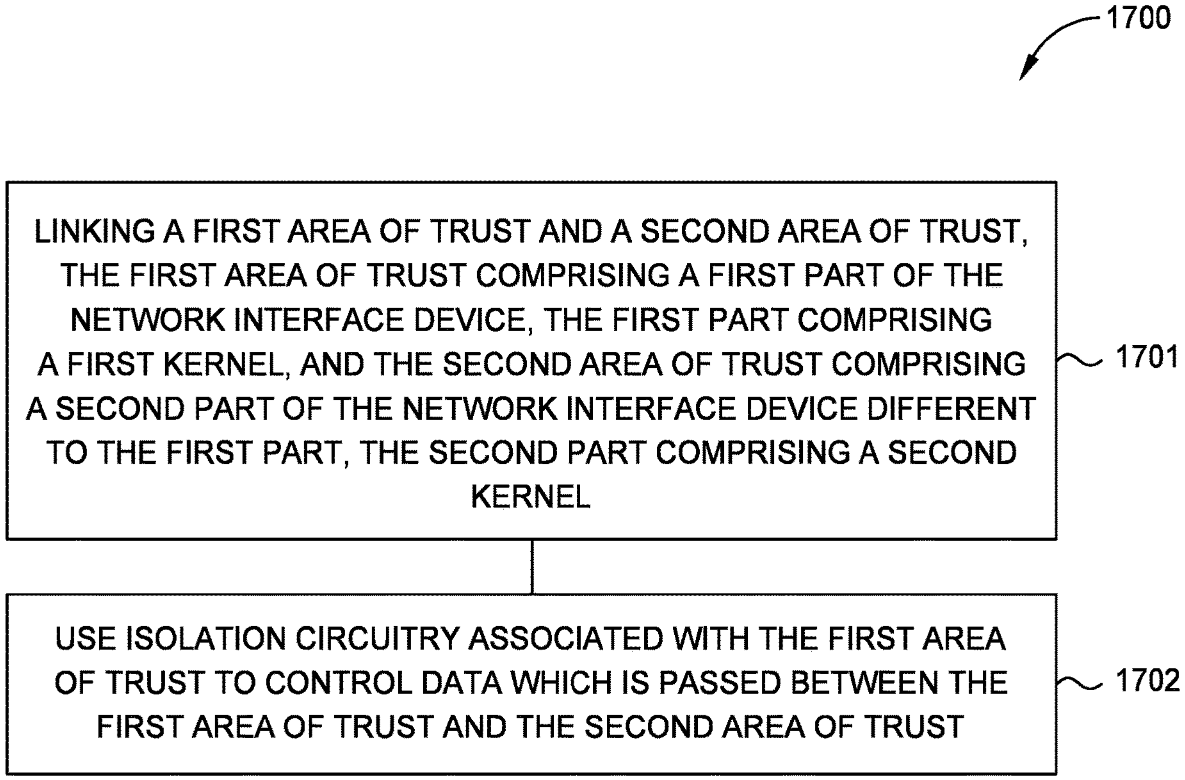
FIG. 17 shows another method of some embodiments.

Reference is made to FIG. 17 which shows a method of some embodiments. This may be performed in a network interface device.

The method comprises in step 1701, linking a first area of trust and a second area of trust, the first area of trust comprising a first part of the network interface device, the first part comprising a first kernel and the second area of trust comprising a second part of the network interface device different to the first part, the second part comprising a second kernel.

The method comprises in step 1702, using isolation circuitry associated with the first area of trust to control data which is passed between the first area of trust and the second area of trust.

In the following example, reference is made to Ceph. Ceph is an example of data storage platform. It should be appreciated that Ceph is one example of a data storage platform and embodiments may be used with any other suitable data storage and/or management platform or application. Other embodiments may alternatively or additionally use NVMe or a distributed object store application.

In storage virtualization, a guest OS may make a request. This request may be a virtio-blk (block) request. This request may be a read or write request. This may be handled by a SPDK (storage performance development kit) BDEV (block device) plugin to Ceph or by any other suitable function.

Virtio devices are provided in virtual environments but appear to be physical devices to the guest with the virtual machine. This is to allow the guest OS to use standard drivers. Virtio-blk is an example of a virtualised storage backend, Virtio-SCSI may be used in other embodiments. In other embodiments, non Virtio devices and non Virtio virtualised storage backends may be provided.

SPDK provides a set of tools and libraries for writing scalable, user-mode storage applications. SPDK may move all of the necessary drivers into user space, which avoids system calls and enables zero-copy access from the application. The SPDK block device layer, BDEV, is a C library intended to be equivalent to the operating system block storage layer that often sits immediately above the device driver in a traditional kernel storage stack. This library may provide a pluggable module API for implementing block devices that interface with block storage devices. Other tools and libraries may be used instead of SPDK in other embodiments.

The Ceph function services the request, via the network using one or more other Ceph nodes. This may use a MSGR protocol (this is a low level protocol over which messages are delivered in Ceph) over TCP Sockets. The host TCP Stack may send a network request and receive responses from one or more remote Ceph nodes. The Ceph function processes the response and completes the SPDK BDEV request. The Virtio-Blk driver may for example deliver read data to the guest OS where the request was a read request.

Figure 13:
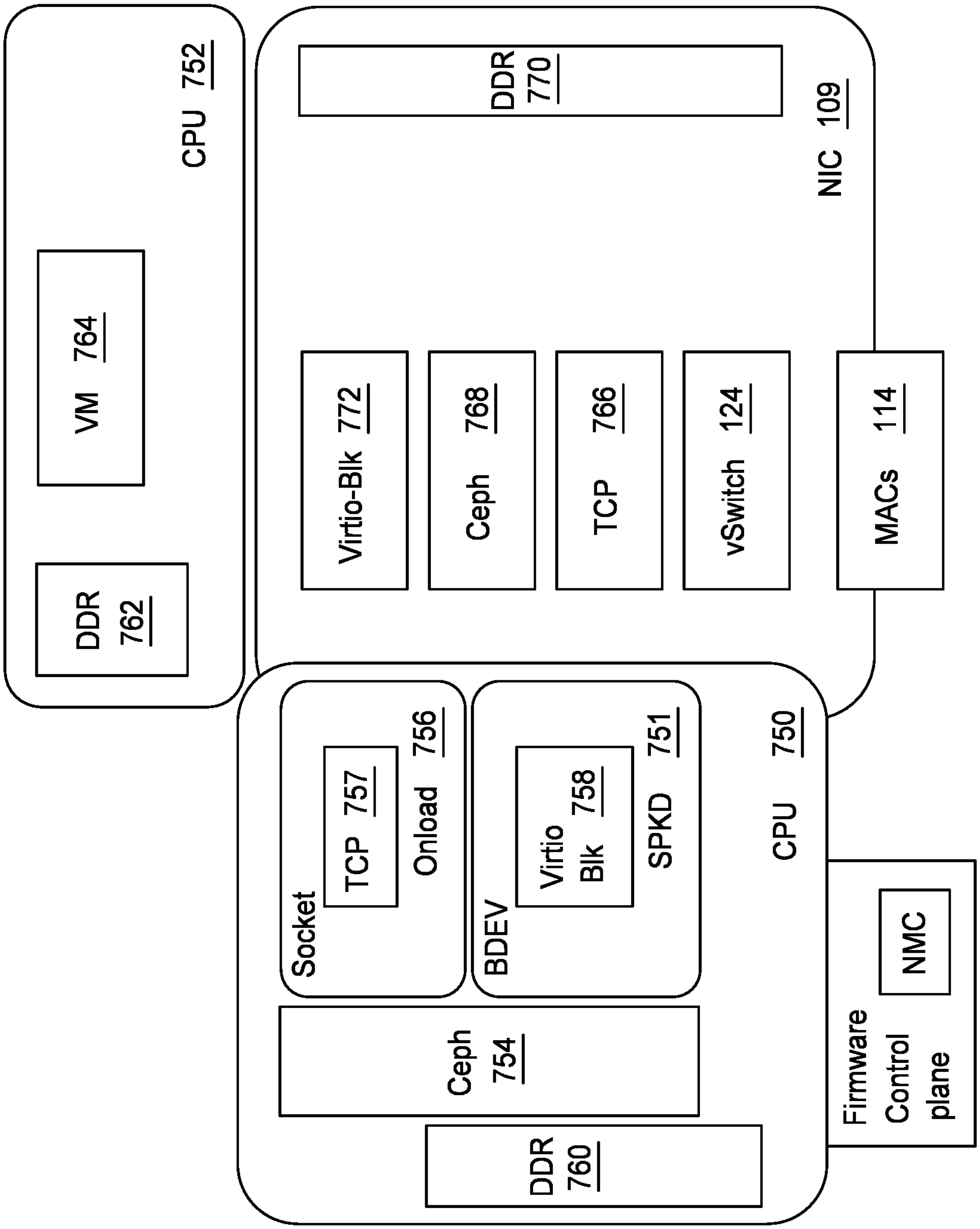
FIG. 13 shows an example of data storage virtualization on the network interface device of some embodiments.
Figure 14:
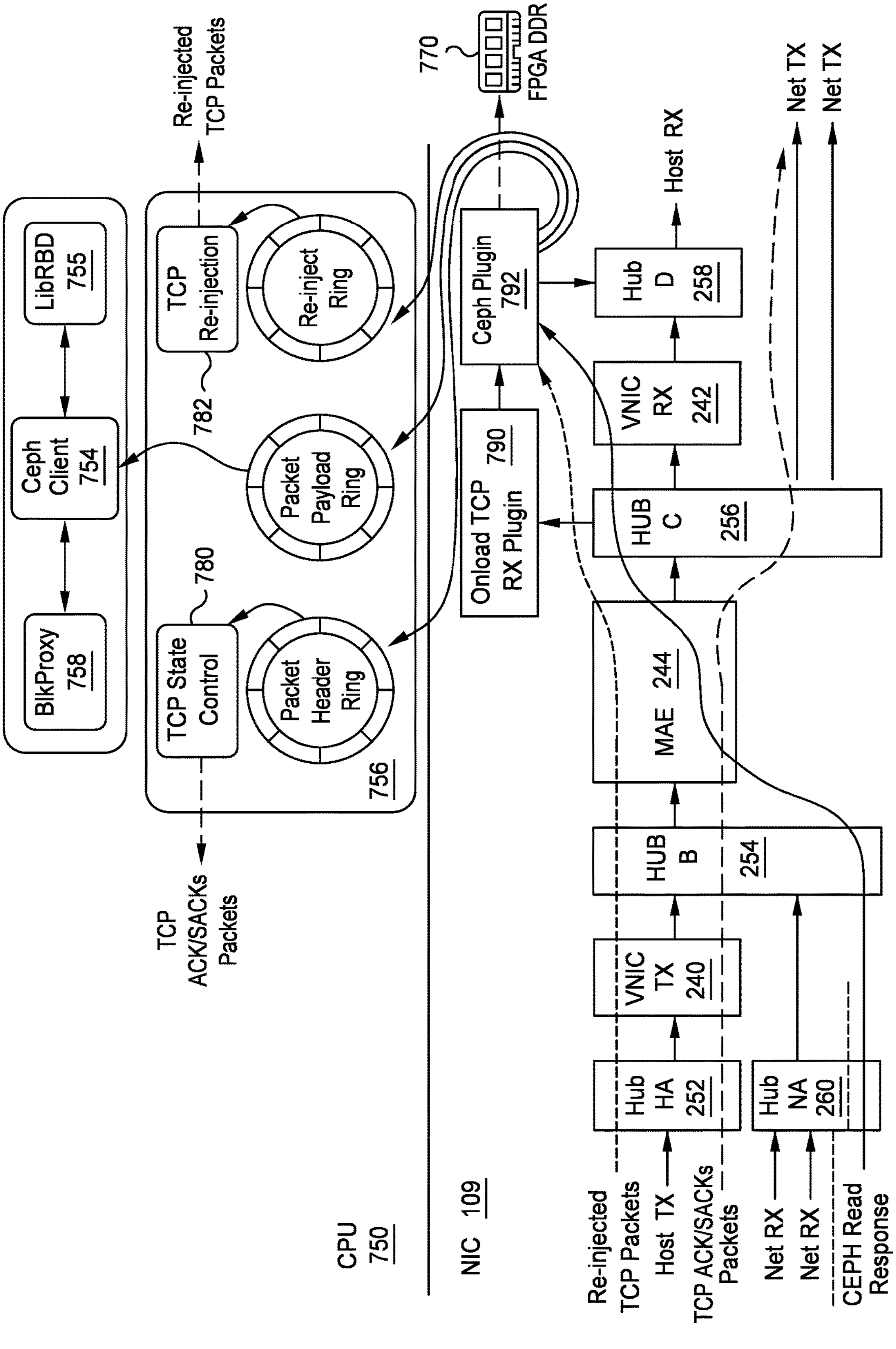
FIG. 14 shows in more detail a part of the example network interface device of FIG. 13.

Reference is made to FIGS. 13 and 14 which show the support of storage virtualisation by the NIC. The NIC may be as previously described.

Some embodiments may facilitate the handling of data rates which may exceed the CPU processing capability.

Some embodiments may separate the control and data handling. The data payload and header may be handled separately.

In some embodiments, the payload data is written to a memory such as a DDR. This may be memory of the NIC or separate to the NIC.

The processing of control data (for example protocol processing) may be in software and the data handling may be in hardware.

In some embodiments, capsules such as previously described may be used.

FIG. 13 shows the NIC 109 which is configured to support storage virtualization. The NIC may be at least partly as previously described. The NIC 109 has one or more MAC layer functions 114. The virtual switch function 102 is configured to receive data from the MACs and/or to provide data to the MACs, as previously described. A TCP module 766 such as described in relation to FIG. 10 may be provided. The TCP module 766 may receive data from the virtual switch function 102 and/or provide data to the virtual switch function. The TCP module may process the data such as previously described.

A Ceph module 768 is provided.

A Virtio-Blk (block) module 772 is provided. Virtio-Blk 772 is a DMA adapter. It presents a standard PCI hardware personality and supports DMA rings conforming to the Virtio standard such that software on CPU 752 can issue Virtio commands to the NIC.

The Ceph module 768 and the Virtio-Blk 772 will be described in more detail. These modules may be implemented in hardware. These modules handle the data plane, in some embodiments. One or other or both of these modules may be implemented as a plugin.

The NIC 109 is provided with DDR memory 770 or any other suitable memory.

A host CPU 752 such as described earlier may be provided. The host CPU may comprise DDR 762 (or other suitable memory) and a virtual machine 764.

A second CPU 750 which is provided by the NIC arrangement or the host may comprise a DDR 760 (or other suitable memory). This may be the same or different to the DDR 770. This may be the same as the second CPU discussed in relation to FIG. 10.

The second CPU comprises a Ceph client 754, a network stack library 756 and a SPDK library 751. The network stack library 756 and the SPDK library 751 are linked with the Ceph client at user space. The network stack library is provided with a socket interface with Ceph. The SPDK library is provided with a BDEV interface with the Ceph client.

The SPDK library comprises a Virtio-Blk software function 758 which is aware of the Virtio-Blk hardware 772 and which is able to use the DMA pointer to non-CPU coherent data (the payloads stored in DDR 770 discussed later)

There may be a performance advantage to not use the operating system kernel of the host for the TCP and Virtio-Blk functions.

The network stack library 756 may be an Onload network stack library provided by the applicant or any other suitable network stack client operating at the user or application level. The Onload library is provided at the application level to allow the protocol aspects to be handled at the user level without the involvement of the operation system. In other words, operating system kernel bypass is supported. The network stack library may support any suitable protocol. In some embodiments, the network stack may support TCP and/or UDP over IP and/or any other suitable protocol. In the example shown in FIGS. 13 and 14, the Onload library supports a TCP function 757.

Reference is made to FIG. 14 which shows aspects of FIG. 13 in more detail using the handling of a Ceph read response as an example. In FIG. 14, a part of the NIC of FIG. 4*a* is schematically shown with a first egress plugin 790 and a second ingress plugin 792. In other embodiments, the NIC of FIG. 4*b* may be used.

The first plugin 790 provides an interface to a network stack provided in the user level. This first plugin may be a Onload TCP RX plugin. This may correspond to the TCP module 766. This plugin is an egress plugin and is from hub 256. This may be a regarded as a packet processor.

The second plugin may be a data storage plugin. For example the second plugin is a Ceph plugin. The second plugin is an ingress plugin and provides an input to hub 258. This plugin may correspond to the Ceph module 768. This may be a regarded as a packet processor.

A data flow or connection may receive a stream of packets of data for the data storage application (Ceph in this example). The packet may comprise a header and the data which is stored. In the example, the data is provided in response to a read request. The header may comprise a Ceph header and a TCP header (or other transport protocol header).

The data is received by the fifth hub 260 from the network receive port streaming engine and directed to the MAE 244 via the second hub 254. The MAE 244 directs the data to the first plugin via the third hub 256.

The first plugin may process the packet to obtain the TCP header part. The first plugin also ensures that the data provided is in order. The first plugin presents an in order byte stream to the data storage plugin 792. The data storage headers may appear at any location in the byte stream (not just as start of the IP segment). If the data arrives out of order then the output to the data storage plugin may include the entire network frame and an indication that the data contains no application data to process.

The first plugin 790 passes the packet to the data storage plugin 792. The data storage plugin separates the data storage application header and the protocol header. For example, the protocol header may be the TCP header. The data storage plugin will output the split off headers to hub 258. The fourth hub will direct the TCP header to the TCP header ring of network stack and the data storage application header to a packet payload ring of the network stack. The data storage plugin will direct the data of the packet direct to memory. The data storage plugin will also provide a pointer with the data storage application header to the packet payload ring of the network stack. The pointer is to the location of the data in memory 770.

The Onload client 756 on the second CPU has a TCP header ring which is associated with TCP state control. This receives the TCP header from hub 258. The Onload client has a packet payload ring which is used to manage the Ceph headers and the data pointer to the location of the data in the memory. There is also a reinjection ring with TCP reinjection control. This is used where the packets are out of order and one or more packets needs to be reinjected to cause the packets to be in the correct order.

At the user level, in the CPU 750, SPDK provides the Virtio-Blk software function 758 and a BDEV interface which interface with the Ceph client 754. BDEV is a library for the block storage component of Ceph. The Ceph client 754 may communicate with Ceph storage. The Ceph client 754 may communicate with remote storage or other Ceph nodes via the socket interface provided by the Onload client. In some embodiments, the Ceph application executes within a different operating system to the application which is making the block storage request. The Ceph application accesses the network via a user-space network stack, for example Open Onload. The Ceph application access its local storage via the user-space storage stack, for example provided by SPDK. The Ceph application accesses cause the data to be transferred by DMA via SPDK.

The processing of a Ceph read response packet will be described. It should be appreciated that a read operation will have started by a virtio-blk read request being generated by VM 764 using the virtio-blk 772 hardware interface, received by the virtio-blk 758 software which issues a BDEV.read API call. The Ceph client 754 had issued a network TCP socket write to other Ceph nodes to request the data. The returning data (read response) is the point at where the example of FIG. 14 picks up.

The Ceph read response packet is received the fifth hub 260 from the network receive port streaming engine and directed to the MAE 244 via the second hub 254. It should be noted that the data is transported by capsules such as previously described. The Ceph receive response comprises the Ceph read data, a Ceph header and a TCP header. The MAE 244 directs the data to the first Onload plugin 790 via the third hub 256.

As can be seen from FIG. 14, the first plugin receives the Ceph read response. The first plugin may process the TCP header of the Ceph response.

The first plugin provides an output to the Ceph plugin. The Ceph plugin writes the Ceph read data to the DDR directly. An output is also provided by the Ceph plugin to hub 258. This output comprises the TCP header and the Ceph header part with a pointer to the memory location where the Ceph read data is stored.

The TCP header is passed to the TCP packet payload ring in the Onload network stack by hub 258.

The Ceph header with the pointer to the Ceph data in the DDR is passed to the packet payload ring in the Onload network stack. The content of the Ceph header will be opaque to the Onload network stack, in some embodiments. The Onload network treats this Ceph data as "application" data. It should be appreciated that alternatively or additionally other applications may be supported.

The Ceph client reads a TCP socket and receives the data, which was stored on the packet payload ring that is the Ceph header with the pointer from the packet payload ring and provides a response to the BDEV interface to complete the BDEV read call. This results in an output to the Virtio-blk 758, (block proxy) which uses the data pointer to cause the read response data to be passed to the virtual machine in the host. The Virtio-blk will cause a DMA of the Ceph read response data to the host memory. The pointer to the DDR is used and a DMA operation is performed to provide the read data to the host memory. The Ceph client is unaware of the properties of the pointer. The Ceph client sees a pointer which is passed over the BDEV interface. It is the Virtio-blk 758 SPDK plugin which is able to invoke hardware DMA operations on the pointer.

The TCP state control of the network stack uses the TCP header to determine if a SACK (selective acknowledgement) or ACK is to be transmitted back to the source of the Ceph read response. The TCP header contains a sequence number and this can be used to determine which packets have been received and if there are missing packets. The SACK/ACK will indicate to the TCP stack of the Ceph peer whether TCP data needs to be retransmitted. Ceph (both the software part 754 and the plugin or hardware part 768) sees a reliable byte stream with retransmission etc. is handled at the TCP layer.

The TCP SACK/ACK is injected into the first hub 252. The TCP SACK/ACK is passed to the VNIC TX engine 240. From the VNIC TX engine the TCP SACK/ACK is passed to the MAE 244 via the second hub 254. The TCP SACK/ACK is passed to the third hub 256 and output to the network transmit port streaming engine 208 for outputting onto the network.

It should be appreciated that the TCP SACK/ACK may be processed as it passes through the streaming subsystem so as to be in a suitable format for transmitting onto the network.

The TCP re-inject ring may be provided for controlling the reinjection of TCP packet. This may be to re-establish the order of the TCP packet flow. The TCP packet sequence number is used to determine if reordering of one or more packets is required. The TCP reinject ring may receive an indication of one or more packets which are to be reinjected from the first plugin via the Ceph plugin and hub 258. The TCP re-inject ring may enable the Ceph plugin to restart hardware processing of application data following a network retransmission or out of order data reception The TCP packet which is to be reinjected will have its TCP header removed from the TCP packet header ring and its Ceph header removed from the packet payload ring.

The reinjected TCP packets are provided to the first hub 252, passed to the VNIC TX engine 240, and directed to the MAE 244 via the second hub 254. The reinjected packet is then passed to the first plugin via the hub 256.

All of the exception path data is sent to software and so the reinjected packet contains all the payload data which the Ceph plugin processes as if it had been received from the network. It is only at this point that the data is stored in the local DDR. The first and second plugs will process the reinjected packet such that the TCP header is passed to the packet header ring and the Ceph header with data pointer of the reinjected packet is added to the packet payload ring.

Alternatively, the Ceph plugin stores in the DDR all of the exception path data even for out of order data. In this embodiment, the reinjected packet may comprise the TCP header and the Ceph header with the pointer to the DDR. The reinjected packet may not include the data stored in the DDR. The reinjected packet may include an indication that the packet is a reinjected packet.

In another embodiments, the TCP stack (or other transport protocol processing stack) may be completely implemented in hardware. This stack would perform all the protocol operations including retransmission. In this example, the Onload software would be omitted. The Ceph plugin 792 would deliver the data pointer to the location of the data in the DDR 770 to the Ceph client 754 in software directly.

Thus, in some embodiments, data plane hardware perform re-assembly operations and parse headers from the data. In some embodiments, this data plane hardware may be provided by one or more plugins to the streaming subsystem. In some embodiments, the data may be held in buffers local to the hardware plugin Some embodiments may cause the headers to be delivered to software via a queue-pair. These headers comprise the control plane part of the data in the capsules. Software may be used to perform control plane functions. The software may handle protocol processing. For example the software may provide TCP protocol processing. This may comprise handling the retransmission process.

Some embodiments may provide storage virtualisation.

Some embodiments may virtualize a block storage Read/Write command at the host such that only header information is processed by embedded CPUs.

In the example shown, plugins are used. It should be appreciated that a different streaming subsystem structure may be used with includes the Onload hardware and Ceph hardware within in the data flow, without the use of plugins for the Onload hardware and Ceph hardware In the example, Ceph, Onload and SPDK are used. These are by way of example only and other embodiments may use any other suitable computer programs.

Figure 15:
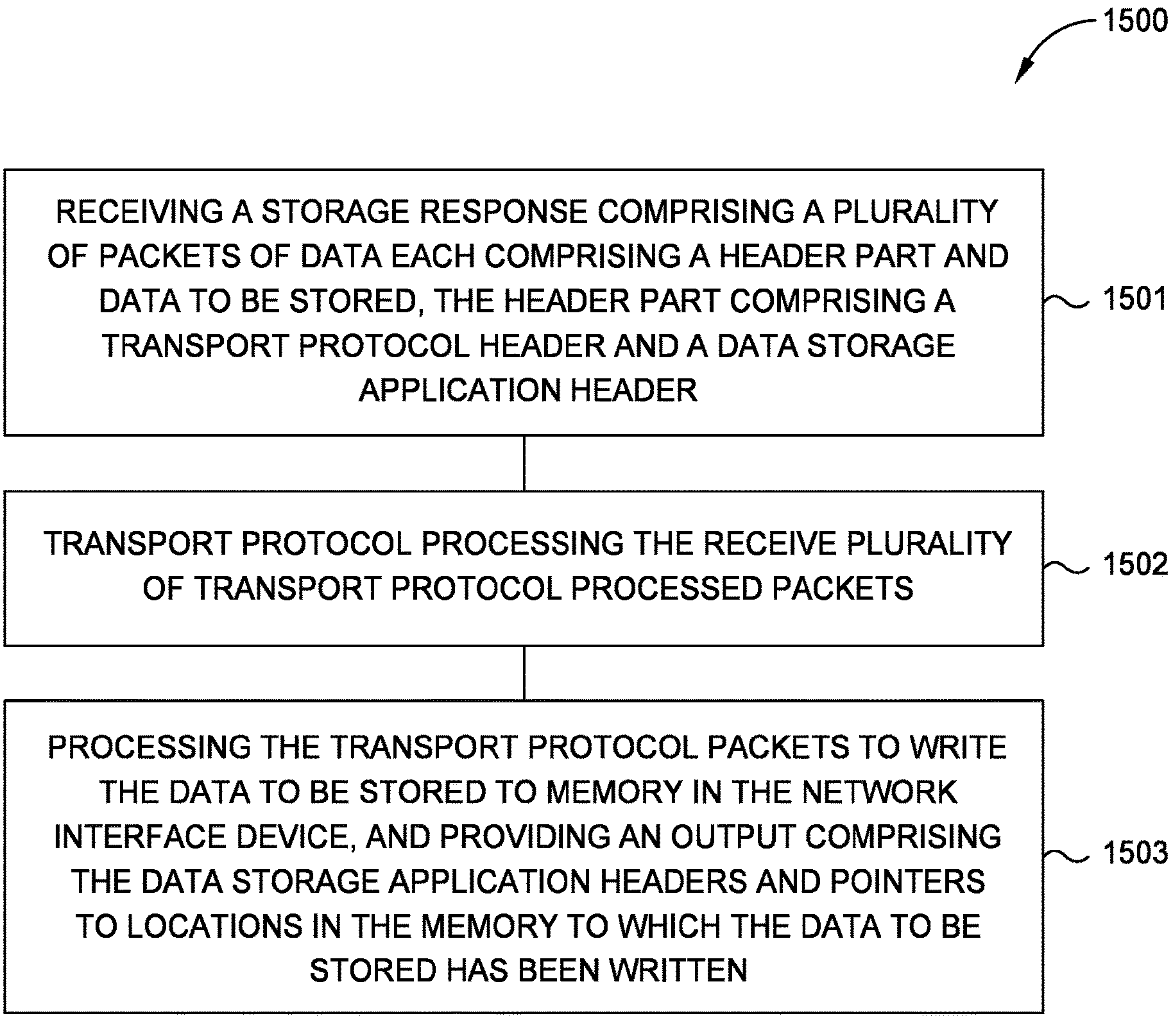
FIG. 15 shows a method of some embodiments.

Reference is made to FIG. 15 which shows a method performed by a network interface device.

In 1501, the method comprises receiving a storage response comprising a plurality of packets of data each comprising a header part and data to be stored, said header part comprising a transport protocol header and a data storage application header.

In 1502, the method comprises transport protocol processing the receive plurality of transport protocol processed packets.

In 1503, the method comprises processing the transport protocol processed packets to write the data to be stored to memory in the network interface device, and providing an output comprising the data storage application headers and pointers to locations in the memory to which the data to be stored has been written.

Though aspects and features may in some cases be described in individual figures, it will be appreciated that features from one figure can be combined with features of another figure even though the combination is not explicitly shown or explicitly described as a combination.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A network interface device comprising:

a data processing path comprising a first data processing engine and hubs;

a first scheduler associated with a first hub of the hubs to control an output of data by the first hub to the first data processing engine; and a second scheduler associated with a second hub of the hubs to control an output of data by the second hub;

wherein the first hub is arranged upstream of the first data processing engine on the data processing path and is configured to receive data from a first upstream data path entity and from a first data processing entity implemented in programmable circuitry via a data ingress interface of the first hub, said first data processing engine configured to receive the data output from the first hub, process the data output from the first hub and output the processed data to the second hub arranged downstream of the first data processing engine.

2. The network interface device as claimed in claim 1, wherein the first hub has a data egress interface configurable to output data to a second data processing entity implemented in programmable circuitry, and the second hub has a data ingress interface configurable to receive data from a third data processing entity implemented in programmable circuitry and a data egress interface configurable to output data to a fourth data processing entity implemented in programmable circuitry.

3. The network interface device as claimed in claim 2, wherein the second hub is configured to output data via its data egress interface to bypass a remaining part of the data processing path.

4. The network interface device as claimed in claim 1, wherein the first hub is configured to receive data from the first upstream data path entity and data from a second upstream data path entity and the first data processing engine is configured to operate at a higher data rate compared to a second data processing engine of the data processing path.

5. The network interface device as claimed in claim 1, wherein the first hub is arranged in parallel with a third hub of the hubs, and the first data processing engine is arranged in parallel with a second data processing engine, wherein the third hub is arranged to provide an output to the second data processing engine.

6. The network interface device as claimed in claim 5, wherein the first and second data processing engines are configured to provide respective outputs to the second hub.

7. The network interface device as claimed in claim 1, wherein the first data processing engine comprises one of:

a receive streaming engine for processing data received from a network;

a transmit processing engine for processing data from a host computing device;

a match action engine;

a network receive port engine for bus format translation; and a network transmit port engine for bus format translation.

8. The network interface device as claimed in claim 1, wherein the first hub comprises a data storage resource and the first scheduler is configured to manage the data storage resource.

9. The network interface device as claimed in claim 8, wherein the data storage resource is configured to store data from the first upstream data path entity and data from the first data processing entity.

10. The network interface device of claim 1, wherein:

the first data processing entity comprises a first plugin circuit implemented in the programmable circuitry; and the first hub is configured to receive a data stream, provide the data stream to the first data processing engine, and perform one or more of:

provide the data stream to the first plugin circuit;

inject data from the first plugin circuit into the data stream; and provide the data stream to another one of the hubs.

11. The network interface device of claim 10, wherein:

the first plugin circuit is configured to provide an interface to a network stack, obtain a protocol header part from a packet, and provide the packet to a second plugin circuit configured in the programmable circuitry;

the second plugin circuit comprises a data storage plugin circuit configured separate a data storage application header and a protocol header from the protocol header part, provide the data storage application header and the protocol header to a third one of the hubs, provide data of the packet to a memory location, and provide a pointer to the memory location and the data storage application header to a packet payload ring of a network stack; and the third hub is configured to provide the protocol header to a protocol header ring of the network stack, and to provide the data storage application header to the packet payload ring of the network stack.

12. The network interface device of claim 1, wherein the first data processing engine comprises a match-action engine configured to parse information from packets, lookup actions based on the parsed information, and initiate the actions, wherein the actions comprise one or more of:

encapsulation;

decapsulation;

virtual switching;

map packets from in input virtual port to an output virtual port;

replicate packets to two or more output ports;

connection tracking and network address translation;

packet filtering;

packet labelling;

explicit congestion notification marking; and packet and byte counting.

13. The network interface device of claim 1, wherein:

the data processing path comprises a bus configured to transmit capsules of various lengths and types, each capsule comprising a metadata portion and a payload portion;

the metadata portion comprises a capsule header and an offset indicating a start of the payload portion; and the capsule header comprises one or more of:

a capsule type identifier;

routing information;

virtual channel information indicating the virtual channel to be used by a capsule; and a length of the capsule.

14. The network interface device of claim 13, wherein:

a length of a first capsule exceeds a bit-width of the bus; and the bus is further configured to transmit a first portion of the first capsule during a first cycle, and to transmit a second portion of the first capsule and a first portion of a second capsule during a second cycle.

15. The network interface device of claim 13, wherein:

the bus is segmented into multiple sub-busses, each configured to stream capsules based on respective control signals.

16. The network interface device of claim 1, wherein the first scheduler is configured to control the output of data from the first hub based on:

source credits received from the first hub, wherein the source credits represent an amount of the data to be sent by the first hub, in terms of one or more of a number of capsules and a number of bus transactions; and destination credits received from a destination of the data, wherein the destination credits represent an amount of available space to receive of the destination.

17. The network interface device of claim 1, wherein:

the data processing path is configured to provide a virtual channel for each of multiple virtual machines of a host.

18. The network interface device of claim 1, wherein:

one or more of the first and second hubs is implemented in fixed-function circuitry;

one or more of the first and second schedulers is implemented in fixed-function circuitry; and the first data processing engine is implemented in fixed-function circuitry with configurable functions.

19. The network interface device of claim 1, wherein:

the data processing path comprises a multi-stage pipeline;

a first stage of the multi-stage pipeline comprises the first data processing engine, the first hub, and the first scheduler; and a second stage of the multi-stage pipeline comprises the second hub, a second data processing engine, and the second scheduler.

20. A network interface device, comprising:

programmable logic programmed as first and second plugin circuits; and a streaming subsystem comprising a multi-stage pipelined data processing path, each stage comprising:

a data processing engine configured to process a data stream;

a hub configured to receive the data stream, provide the data stream to the data processing engine, and perform one or more of:

provide the data stream to the first plugin circuit; and inject data from the second plugin circuit into the data stream; and a scheduler configured to schedule data movement amongst the data processing engine and one or more of the first and second plugin circuits.

* * * * *